US012694014B2

(12) United States Patent
Labbate et al.

(10) Patent No.: US 12,694,014 B2
(45) Date of Patent: Jul. 28, 2026

(54) EXECUTION OF A SPARQL QUERY OVER AN RDF DATASET STORED IN A DISTRIBUTED STORAGE

(71) Applicant: DASSAULT SYSTEMES, Velizy Villacoublay (FR)

(72) Inventors: Frédéric Labbate, Vélizy-Villacoublay (FR); Eric Vallet Glenisson, Vélizy-Villacoublay (FR); Jean-Philippe Sahut D'Izarn, Vélizy-Villacoublay (FR); Alexandre Juton, Waltham, MA (US)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 18/990,422

(22) Filed: Dec. 20, 2024

(65) Prior Publication Data

US 2025/0209056 A1     Jun. 26, 2025

(30) Foreign Application Priority Data

Dec. 21, 2023   (EP) ..................................... 23307333

(51) Int. Cl.
*G06F 16/23*          (2019.01)
*G06F 16/901*         (2019.01)

(52) U.S. Cl.
CPC ...... *G06F 16/2365* (2019.01); *G06F 16/2308* (2019.01); *G06F 16/9024* (2019.01)

(58) Field of Classification Search
CPC ............. G06F 16/2365; G06F 16/2308; G06F 16/9024; G06F 16/172; G06F 16/1824;
(Continued)

(56) References Cited

U.S. PATENT DOCUMENTS

| 10,372,770 | B1 * | 8/2019 | Faibish | ................... G06F 16/81 |
| 2010/0036862 | A1 * | 2/2010 | Das | ......................... G06F 16/86 |
| | | | | 707/698 |

(Continued)

FOREIGN PATENT DOCUMENTS

EP          4383090 A1      6/2024

OTHER PUBLICATIONS

High Availability RDF Delta System; https://web.archive.org/web/20201107151620/https://afs.github.io/rdf-delta/ha-system.html; Nov. 7, 2020 (Year: 2020).*

(Continued)

*Primary Examiner* — Dennis Truong
(74) *Attorney, Agent, or Firm* — Oblon, McClelland, Maier & Neustadt, L.L.P.

(57)          ABSTRACT

A computer-implemented method for updating a virtual RDF graph database, the virtual database comprising tuples including a file storage having a durability property of ACID property and guarantying consistent write, providing a virtual RDF graph database including a first RDF graph database updatable by streams and a second read-only RDF graph database stored on the file storage and updatable by batches, a catalog for storing metadata describing the second read-only RDF graph database on the file storage, the catalog being compliant with ACID and obtaining a stream of tuples and a batch of tuples, applying the stream of tuples on the first RDF graph database, applying the batch of tuples on the second RDF graph database by computing a snapshot of the second RDF graph database, including the batch of tuples, the computed snapshot and registering the computed snapshot in the catalog.

21 Claims, 6 Drawing Sheets

(58) Field of Classification Search
    CPC .... G06F 16/188; G06F 16/2237; G06F 16/23;
                G06F 16/2433; G06F 16/24573; G06F
                                16/27; H04L 67/1097
    See application file for complete search history.

(56)                    References Cited

U.S. PATENT DOCUMENTS

| | | | | |
|---|---|---|---|---|
| 2010/0070448 | A1* | 3/2010 | Omoigui | H10F 39/1825 |
| | | | | 706/55 |
| 2015/0120643 | A1* | 4/2015 | Dantressangle | G06F 16/254 |
| | | | | 707/610 |
| 2022/0083505 | A1* | 3/2022 | Kushwah | H04L 67/568 |
| 2023/0185810 | A1* | 6/2023 | Dekoker | G06N 5/046 |

OTHER PUBLICATIONS

Taelman et al.;Optimizing Storage of RDF Archives using Bidirectional Delta Chains; https://www.semantic-web-journal.net/system/files/swj2666.pdf; Jan. 7, 2021 (Year: 2021).*
"RDF 1.1 Concepts and Abstract Syntax", W3C Recommendation, Feb. 25, 2014, Retrieved on Dec. 16, 2024. (20 pages) https://www.w3.org/TR/rdf11-concepts/.
"SPARQL Query Language", W3C Recommendation Mar. 21, 2013, Retrieved on Dec. 19, 2024. (97 pages).
"Isolation-ACID", Wikipedia, Retrieved on Dec. 19, 2024. (3 pages) https://en.wikipedia.org/wiki/ACID#Isolation.
Dearmer, Abe, "Storing Apache Hadoop Data on the Cloud—HDFS vs. S3 | Integrate.io", Retrieved on Dec. 19, 2024. (6 pages) https://www.integrate.io/blog/storing-apache-hadoop-data-cloud-hdfs-vs-s3/.
Radalj, Mate, "Streaming Use Cases for Snowflake With Kafka", Medium, Retrieved on Dec. 19, 2024. (18 pages) https://medium.com/snowflake/the-snowflake-data-platform-is-great-for-many-kafka-streaming-use-cases-2281e7a4dfa8.
"Partition (database)", Wikipedia, Retrieved on Dec. 19, 2024. (2 pages), https://en.wikipedia.org/wiki/Partition (database).
"RDF 1.1 Turtle", Terse RDF Triple Language, W3C Recommendation Feb. 25, 2014, Retrieved on Dec. 19, 2024. (17 pages) https://www.w3.org/TR/turtle/.
"RDF 1.1 TriG", RDF Dataset Language, W3C Recommendation Feb. 25, 2014, Retrieved on Dec. 19, 2024. (16 pages) https://www.w3.org/TR/trig/.
"Snapshot isolation", Wikipedia, Retrieved on Dec. 19, 2024. (5 pages) https://en.wikipedia.org/wiki/Snapshot_isolation.
"Unix File System", Wikipedia, Retrieved on Dec. 19, 2024. (6 pages), https://en.wikipedia.org/wiki/Unix_File_System.
"Amazon S3 Strong Consistency", Amazon Web Services, Retrieved on Dec. 19, 2024. (9 pages), https://aws.amazon.com/s3/consistency/.
"Strong consistency", Wikipedia, Retrieved on Dec. 20, 2024. (1 page) https://en.wikipedia.org/wiki/Strong_consistency.
"Consistency",—FoundationDB ON documentation, Retrieved on Dec. 20, 2024. (2 pages) https://apple.github.io/foundationdb/consistency.html.
"FoundationDB 7.3.57",—FoundationDB ON documentation, Retrieved on Dec. 20, 2024. (2 pages) https://apple.github.io/foundationdb/index.html.
"Maria DB Enterprise Open Source Database | MariaDB", Retrieved on Dec. 20, 2024. (3 pages) https://mariadb.com/.
"Scalability for Mission-Criticaldata-Intensive Applications", Scalability with MariaDB | MariaDB, Retrieved on Dec. 20, 2024. (3 pages) https://mariadb.com/products/enterprise/xpand/.
"Create Stage | Snowflake Documentation", Retrieved on Dec. 20, 2024. (64 pages) https://docs.snowflake.com/en/sol-reference/sql/create-stage.
"Manage access to cloud storage using Unity Catalog", Dec. 2024, databricks, Retrieved on Dec. 20, 2024. (4 pages) https://docs.databricks.com/data-governance/unity-catalog/manage-external-locations-and-credentials.html.

"Create Storage Integration", Snowflake Documentation, Retrieved on Dec. 20, 2024. (11 pages) https://docs.snowflake.com/en/sol-reference/sql/create-storage-integration.
"Amazon Redshift provisioned clusters—Amazon Redshift", AWS, Retrieved on Dec. 20, 2024. (6 pages)https://docs.aws.amazon.com/redshift/latest/mgmt/working-with-clusters.html.
"Multi-cluster warehouses", Snowflake Documentation, Retrieved on Dec. 20, 2024. (10 pages) https://docs.snowflake.com/en/user-guide/warehouses-multicluster.
"Compute", Databricks on AWS, Retrieved on Dec. 20, 2024. (3 pages) https://docs.databricks.com/en/compute/index.html.
"Graph homomorphism", Wikipedia, Retrieved on Dec. 20, 2024. (6 pages) https://en.wikipedia.org/wiki/Graph_homomorphism.
Alvarez-Garcia, Sandra et al., (2014), "Compressed Vertical Partitioning for Efficient RDF Management" Knowledge and Information Systems, 10.1007/s10115-014-0770-y, Aug. 2014, Springer, pp. 439-474(36 pages).
"Blazegraph High Performance Graph Database", GitHub—blazegraph/database: Retrieved on Dec. 20, 2024. (7 pages) https://github.com/blazegraph/database.
"Datatypes", RDF 1.1 Concepts and Abstract Syntax, Retrieved on Dec. 20, 2024. (1 page) https://www.w3.org/TR/rdf11-concepts/#section-Datatypes.
"Create-cluster—AWS CLI 2.22.21 Command Reference", 2018, Amazon Web Services. Created using Sphinx, Retrieved on Dec. 20, 2024. (21 pages) https://awscli.amazonaws.com/v2/documentation/api/latest/reference/redshift/create-cluster.html.
"Abox", Wikipedia, Retrieved on Dec. 20, 2024. (2 pages) https://en.wikipedia.org/wiki/Abox.
"RDFS entailment", RDF 1.1 Semantics, Retrieved on Dec. 20, 2024. (2 pages), https://www.w3.org/TR/rdf11-mt/#rdfs-entailment.
"Internationalization and localization", Weikipedia, Retrieved on Dec. 20, 2024. (9 pages), https://en.wikipedia.org/w/index.php?title=National_Language_Support&redirect=no.
"Computer security", Wikipedia, Retrieved on Dec. 20, 2024. (2 pages), https://en.wikipedia.org/wiki/Access_control#Computer_security.
"SPARQL 1.1 Update", W3C Recommendation Mar. 21, 2013, Retrieved on Dec. 20, 2024. (31 pages), https://www.w3.org/TR/sparql11-update/.
"Locking objects with Object Lock", Amazon Simple Storage Service, Retrieved on Dec. 20, 2024. (4 pages) https://docs.aws.amazon.com/AmazonS3/latest/userguide/object-lock.html.
"Diagnose and resolve latch contentionon SQL Server", Whitepaper: Diagnose & resolve latch contention—SQL Server | Microsoft Learn, Retrieved on Dec. 20, 2024. (47 pages), https://learn.microsoft.com/en-us/sql/relational-databases/diagnose-resolve-latch-contention.
Ganapathi, D., "Split brain in distributed systems", Nerd For Tech | Medium, Retrieved on Dec. 20, 2024. (8 pages), https://medium.com/nerd-for-tech/split-brain-in-distributed-systems-252b0d4d122e.
"Universally unique identifier", Wikipedia, Retrieved on Dec. 20, 2024. (7 pages), https://fr.wikipedia.org/wiki/Universally_unique_identifier.
"Deleting Amazon S3 objects", Amazon Simple Storage Service, Retrieved on Dec. 20, 2024. (3 pages), https://docs.aws.amazon.com/AmazonS3/latest/userguide/DeletingObjects.html.
"Extensional and intensional definitions", Wikipedia, Retrieved on Dec. 21, 2024. (3 pages), https://en.wikipedia.org/wiki/Extensional_and_intensional_definitions.
"Change data capture", Wikipedia, Retrieved on Dec. 21, 2024. (4 pages), https://en.wikipedia.org/wiki/Change_data_capture.
"Amazon S3 Update—Strong Read-After-Write Consistency", AWS News Blog, Retrieved on Dec. 21, 2024. (2 pages), https://aws.amazon.com/blogs/aws/amazon-s3-update-strong-read-after-write-consistency/.
"Cache replacement policies", Wikipedia, Retrieved on Dec. 21, 2024. (11 pages), https://en.wikipedia.org/wiki/Cache_replacement_policies.
"Describe (Informative)", SPARQL 1.1 Query Language, Retrieved on Dec. 21, 2024. (2 pages), https://www.w3.org/TR/sparql11-query/#describe.

(56) References Cited

OTHER PUBLICATIONS

"Drop", SPARQL 1.1 Update, Retrieved on Dec. 21, 2024. (1 page), https://www.w3.org/TR/sparql11-update/#drop.

Valduriez, P. et al., M.T., 2021, "Distributed database systems: The case for newSQL", In Transactions on Large-Scale Data-and Knowledge-Centered Systems XLVIII: Special Issue In Memory of Univ. Prof. Dr. Roland Wagner (pp. 1-15). Berlin, Heidelberg: Springer Berlin Heidelberg. (16 pages).

Mohammed, H.H. et al., T.S., Mar. 2022. "Distributed Query Processing and Reasoning Over Linked Big Data", In Southwest Data Science Conference (pp. 158-170). Cham: Springer Nature Switzerland. (14 pages).

Graux, D., Jachiet, L., Genevès, P. and Layaïda, N., 2016. Sparqlgx: Efficient distributed evaluation of sparql with apache spark. In The Semantic Web—ISWC 2016: 15th International Semantic Web Conference, Kobe, Japan, Oct. 17-21, 2016, Proceedings, Part II 15 (pp. 80-87). Springer International Publishing.(9 pages).

Kalogeros, E. et al., 2023. "Efficient query evaluation techniques over large amount of distributed linked data", Information Systems, 115, pp. 1-71. (71 pages).

Galarraga, L. et al., Apr. 2014, "Partout: a distributed engine for efficient RDF processing", In Proceedings of the 23rd International Conference on World Wide Web (pp. 267-268), (12 pages).

Peng, P. et al., 2016, "Processing SPARQL queries over distributed RDF graphs", The VLDB Journal, 25, pp. 243-268. (30 pages).

Zou, L. et al., M.T., 2017, "Graph-based RDF data management" Data Science and Engineering, 2, pp. 56-70. (15 pages).

Ali, W. et al., A.C.N., (2022), "A survey of RDF stores & SPARQL engines for querying knowledge graphs", The VLDB Journal, pp. 1-51. (51 pages).

Snowflake "Key Concepts & Architecture", 2023 Snowflake Inc., online, Retrieved on Dec. 21, 2024, (4 pages), https://docs.snowflake.com/en/user-guide/intro-key-concepts.

"Iceberg Table Spec", Apache Iceberg 1.3.0, online, Retrieved on Dec. 21, 2024, (123 pages), https://iceberg.apache.org/spec/.

"Snowpipe Streaming", 2023 Snowflake Inc., online, Retrieved on Dec. 21, 2024, (12 pages),https://docs.snowflake.com/en/user-guide/data-load-snowpipe-streaming-overview.

Fernandex, J.D. et al., 2013, "Binary RDF representation for publication and exchange (HDT)" Journal of Web Semantics, 19, pp. 22-41. (20 pages).

Tomaszuk, D. et al., 2020. "RDF 1.1: Knowledge representation and data integration language for the Web", Symmetry, 12(1), p. 1-33. (33 pages).

"GitHub—ontop/ontop: Ontop is a platform to query relational databases as Virtual RDF Knowledge Graphs using SPARQL", Retrieved on Dec. 21, 2024. (4 pages),https://github.com/ontop/ontop.

"RDF Dataset", SPARQL 1.1 Query Language, Retrieved on Dec. 21, 2024. (8 pages), https://www.w3.org/TR/sparql11-query/#rdfDataset.

"RDF 1.1 N-Quads", A line-based syntax for RDF datasets, W3C Recommendation Feb. 25, 2014, Retrieved on Dec. 21, 2024. (10 pages)https://www.w3.org/TR/n-quads/.

European Search Report date Jun. 24, 2024, issued in counterpart EP application No. 23307333.7. (8 pages).

Bereta, Konstantina et al.,: "OBDA for the WEb: Creating Virtual RDF Graphs On Top of Web Data Sources [Application Papers]", May 22, 2020 (May 22, 2020), pp. 1-12. (12 pages).

Kemper, A. st al., : "HyPer: A hybrid OLTP&OLAP main memory database based on virtual memory snapshots", Data Engineering (ICDE), 2011 IEEE 27th International Conference on, Apr. 1, 2011 (Apr. 1, 2011), pp. 195-206. (12 pages).

* cited by examiner

Figure 1:
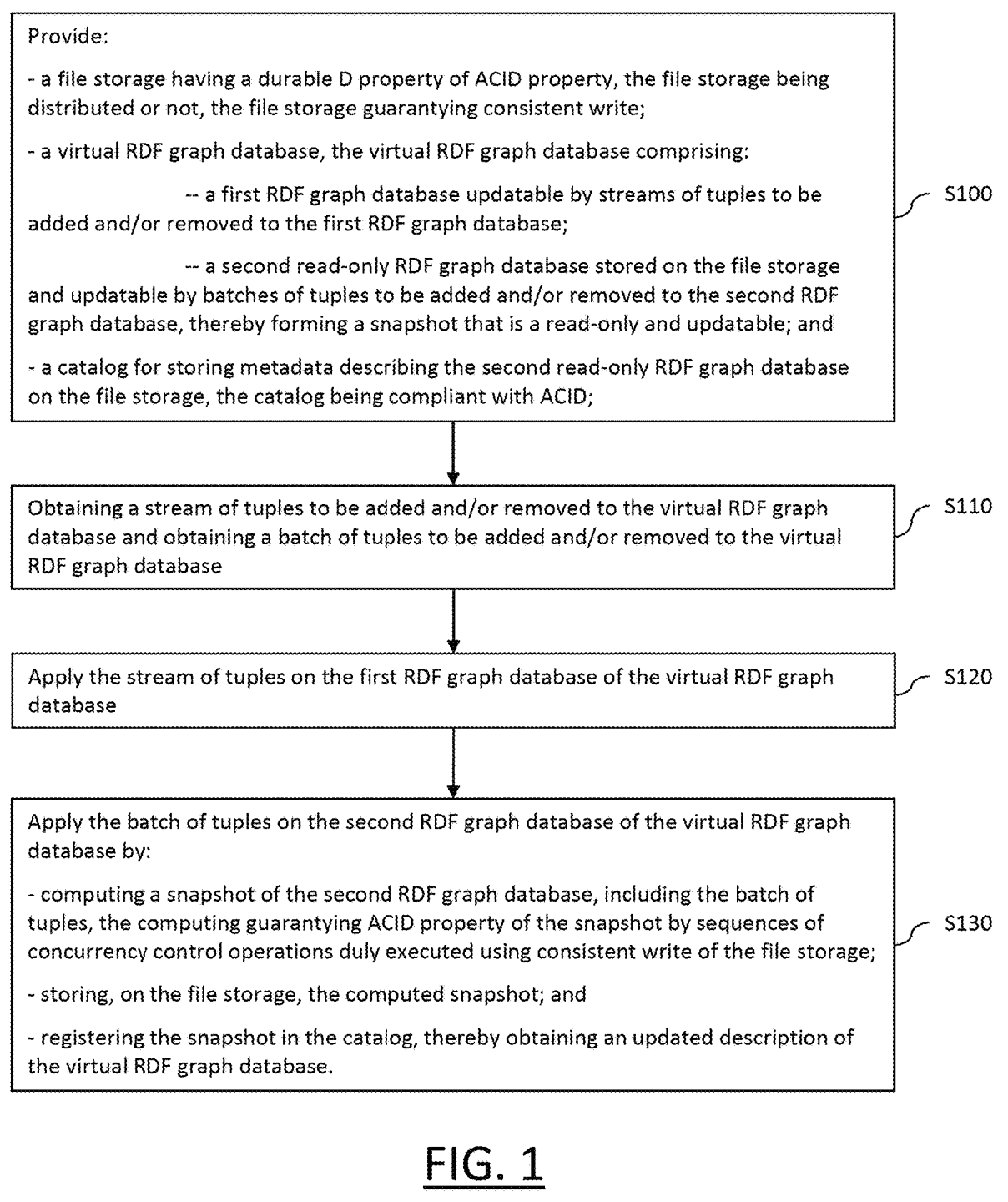

Provide:

- a file storage having a durable D property of ACID property, the file storage being distributed or not, the file storage guarantying consistent write;

- a virtual RDF graph database, the virtual RDF graph database comprising:

-- a first RDF graph database updatable by streams of tuples to be added and/or removed to the first RDF graph database;

-- a second read-only RDF graph database stored on the file storage and updatable by batches of tuples to be added and/or removed to the second RDF graph database, thereby forming a snapshot that is a read-only and updatable; and

- a catalog for storing metadata describing the second read-only RDF graph database on the file storage, the catalog being compliant with ACID;

⟶ S100

---

Obtaining a stream of tuples to be added and/or removed to the virtual RDF graph database and obtaining a batch of tuples to be added and/or removed to the virtual RDF graph database

⟶ S110

---

Apply the stream of tuples on the first RDF graph database of the virtual RDF graph database

⟶ S120

---

Apply the batch of tuples on the second RDF graph database of the virtual RDF graph database by:

- computing a snapshot of the second RDF graph database, including the batch of tuples, the computing guarantying ACID property of the snapshot by sequences of concurrency control operations duly executed using consistent write of the file storage;

- storing, on the file storage, the computed snapshot; and

- registering the snapshot in the catalog, thereby obtaining an updated description of the virtual RDF graph database.

Obtain a last registered snapshot of a virtual RDF graph database described in the catalog     S200 for the triple pattern obtained, executing the triple pattern on the first RDF graph database of the virtual RDF graph database and on the obtained last snapshot, thereby guarantying isolation of the execution of the triple pattern     S210

| Name | Description |
|---|---|
| CREATE STORAGE INTEGRATION [Storage integration name] { ... } | To avoid duplicating information for each stage, a storage integration is used to manage authentication with the cloud storage service such as an object storage (S3). |
| DROP STORAGE INTEGRATION [name] | Drop a storage integration |
| CREATE STAGE [external stage name] { STORAGE_INTEGRATION = [Storage integration name] , ...} | Create named external stage : it is used for loading data from files stored outside of the database. The files are stored inside an external cloud storage. |
| DROP STAGE [external stage name] | Drop a named external stage. |
| CREATE DATASET [dataset name] { STAGE = [stage name] } | Create a dataset whose content will be stored inside referenced stage. |
| CONNECT TO DATASET [dataset name] ON CLUSTER [cluster name] | Connect to a dataset |
| DESCRIBE DATASET { [dataset name] } | Describes a dataset, including its storage description and its data files. |
| DROP DATASET [dataset name] | Drop a dataset |
| ADD PARTITION [Partition Name] WITH CONTENT [file.ttl.gz] DESCRIPTION "description" INTO [dataset Name] | Add a partition based on a compressed (with gzip) RDF file inside a dataset.<br><br>The data of the files are accessible once an ALTER ... REFRESH command is issued successfully. |
| ALTER PARTITION [Partition Name] WITH CONTENT [file.ttl.gz] DESCRIPTION "description" INTO [dataset Name] | Alter the content of the given partition with the new compressed RDF file. The data of the files are accessible once an ALTER ... REFRESH command is issued successfully |
| REMOVE PARTITION [PARTITION NAME] FROM [Dataset Name] | Remove the given partition from the dataset. Requires an ALTER ... REFRESH command issued successfully. |
| ALTER DATASET [dataset name] REFRESH | Create a new dataset snapshot based on the current state of the dataset and refresh the list of available dataset snapshot definitions. |

FIG. 4

```
PREFIX dc: <http://purl.org/dc/elements/1.1/>
DELETE DATA
{ GRAPH <http://example/bookStore> { <http://example/book1>  dc:title  "Fundamentals of Compiler Desing" } } ;

PREFIX dc: <http://purl.org/dc/elements/1.1/>
INSERT DATA
{ GRAPH <http://example/bookStore> { <http://example/book1>  dc:title  "Fundamentals of Compiler Design" } }
```

FIG. 5

EXECUTION OF A SPARQL QUERY OVER AN RDF DATASET STORED IN A DISTRIBUTED STORAGE

CROSS REFERENCE TO RELATED APPLICATIONS

This application claims priority under 35 U.S.C. § 119 or 365 European Patent Application No. 23307333.7 filed on Dec. 21, 2023. The entire contents of the above application are incorporated herein by reference.

TECHNICAL FIELD

The disclosure relates to the field of computer programs and systems, and more specifically to a method, system and program for updating a RDF graph database that is partitioned on an heterogenous storage.

BACKGROUND

The RDF specification (www.w3.org/TR/rdf11-concepts/) has been published by the W3C to represent information as graphs using triples: "The core structure of the abstract syntax is a set of triples, each consisting of a subject, a predicate and an object. A set of such triples is called an RDF graph. An RDF graph can be visualized as a node and directed-arc diagram, in which each triple is represented as a node-arc-node link." An RDF graph stores RDF data, where RDF data means triples inside RDF graphs, as per the previous definitions.

SPARQL is the query language for RDF data (www.w3.org/TR/sparql11-query/): "RDF is a directed, labeled graph data format for representing information in the Web. This specification defines the syntax and semantics of the SPARQL query language for RDF. SPARQL can be used to express queries across diverse data sources, whether the data is stored natively as RDF or viewed as RDF via middleware. SPARQL contains capabilities for querying required and optional graph patterns along with their conjunctions and disjunctions. SPARQL also supports aggregation, subqueries, negation, creating values by expressions, extensible value testing, and constraining queries by source RDF graph. The results of SPARQL queries can be result sets or RDF graphs."

RDF knowledge graphs have grown to billions of triples. To be able to scale to this amount of data, it is mandatory to distribute both compute and storage for SPARQL queries over RDF data. In a Cloud environment, compute and storage have different cost models; therefore, they are both distributed and scale separately, similarly in Snowflake for SQL data. Compute and storage are separated and distributed differently.

The storage distribution is now discussed.

In the field of RDF, several techniques can be used to determine how data can be partitioned in a distributed storage. This is for example discussed in Kalogeros, E., Gergatsoulis, M., Damigos, M. and Nomikos, C., 2023. *Efficient query evaluation techniques over large amount of distributed linked data*. Information Systems, 115, p. 102194.

A common way as in SPARQLGFX is disclosed in Graux, D., Jachiet, L., Genevès, P. and Layaïda, N., 2016. *Sparqlgx: Efficient distributed evaluation of sparql with apache spark*. In The Semantic Web-ISWC 2016: 15th International Semantic Web Conference, Kobe, Japan, Oct. 17-21, 2016, Proceedings, Part II 15 (pp. 80-87). SPARQLGFX uses a distributed file system, as Hadoop File System (HDFS) or Amazon's Simple Storage Service (S3). A comparison between both can be reached here: www.integrate.io/blog/storing-apache-hadoop-data-cloud-hdfs-vs-s3/. For the reasons listed in this article, the industry targets S3 more than HDFS.

Many distributed RDF databases are read-only or do not consider how partitions are modified. "Partout", discussed in Galárraga, L., Hose, K. and Schenkel, R., 2014, April. *Partout: a distributed engine for efficient RDF processing*. In Proceedings of the 23rd International Conference on World Wide Web (pp. 267-268), accepts updates to the graph, but there are no ACID guarantees. "Partout" accepts updates, but only batch updates so that no modifications can be done in streaming and be immediately visible to queries.

ACID properties—ACID stands for Atomicity, Consistency, Isolation, Durability—is a set of properties of database transactions intended to guarantee data validity despite errors, power failures, and other mishaps. ACID properties make it possible, for example, to be able to start a transaction and during this transaction, all SPARQL queries see the same version of the data, even if the data are updated concurrently in one or more partitions. For example, ACID properties are discussed here en.wikipedia.org/wiki/ACID. ACID Documents Zou, L. and Özsu, M. T., 2017. *Graph-based RDF data management*. Data Science and Engineering, 2, pp. 56-70 and Ali, W., Saleem, M., Yao, B., Hogan, A. and Ngomo, A. C. N., 2022. *A survey of RDF stores & SPARQL engines for querying knowledge graphs*. The VLDB Journal, pp. 1-26, disclose recent approaches to execute SPARQL queries on a distributed storage and can be seen as NoSQL approaches versus traditional SQL approaches, as defined in the document Valduriez, P., Jiménez-Peris, R. and Özsu, M. T., 2021. *Distributed database systems: The case for newSQL. In Transactions on Large-Scale Data-and Knowledge-Centered Systems XLVIII: Special Issue*. In Memory of Univ. Prof. Dr. Roland Wagner (pp. 1-15).

In the field of relational SQL distributed storage, a similar need has arisen with the difference that relational databases manipulate tables with schema instead of schema-less graphs in RDF. Therefore, the techniques used in the relational world cannot be applied as-is to the world of graph database; indeed, relational and graph database rely on different paradigms.

Apache Iceberg "is an open table format for huge analytic datasets. Iceberg adds tables to compute engines [ . . . ] using a high-performance table format that works just like a SQL table." The Iceberg table format "is designed to manage a large, slow-changing collection of files in a distributed file system or key-value store as a table", as disclosed in Iceberg Table Spec, Apache Iceberg 1.3.0, online, iceberg.apache.org/spec/. In short, an Iceberg table is made of several binary files stored in a distributed storage and accessed through metadata files that give the list of files corresponding to the snapshot of the state of the table at a given time. The idea is similar to the ones seen in Documents Zou, L. and Özsu, M. T., 2017. Graph-based RDF data management. Data Science and Engineering, 2, pp. 56-70 and Ali, W., Saleem, M., Yao, B., Hogan, A. and Ngomo, A. C. N., 2022. A survey of RDF stores & SPARQL engines for querying knowledge graphs. The VLDB Journal, pp. 1-26, but Iceberg offers ACID guarantees thanks to the metadata and manifest files. However, Iceberg does not support streaming modifications, only batch updates, since it is completely based on files only.

Snowflake is discussed in *Snowflake Key Concepts & Architecture,* 2023 Snowflake Inc., docs.snowflake.com/en/ user-guide/intro-key-concepts., Snowflake offers a capability called Snowpipe Streaming. It combines in one table both Snowpipe, which load data from files in micro-batches similarly to Iceberg, with a streaming API that loads streaming data rows with low latency. It seems that snowflake comes with ACID transaction semantics, but Snowflake being a commercial product, almost no details are available. Snowflake limitations are that only insert of rows is supported.

Within this context, there is still a need for an improved RDF heterogeneous distributed storage made mainly of non-ACID compliant storage that is able to execute a SPARQL query, including update/delete of triples, with ACID guarantees.

SUMMARY

It is therefore provided a computer-implemented method for updating a virtual RDF graph database, the virtual RDF graph database comprising tuples. The method comprises:
  providing:
    a file storage having a durability D property of ACID property, the file storage being distributed or not, the file storage guarantying consistent write;
    a virtual RDF graph database, the virtual RDF graph database comprising:
      a first RDF graph database updatable by streams of tuples to be added to and/or removed from the first RDF graph database;
      a second read-only RDF graph database stored on the file storage and updatable by batches of tuples to be added to and/or removed from the second RDF graph database, thereby forming a snapshot that is a read-only and updatable;
      a catalog for storing metadata describing the second read-only RDF graph database on the file storage, the catalog being compliant with ACID;
  obtaining a stream of tuples to be added to and/or removed from the virtual RDF graph database and obtaining a batch of tuples to be added to and/or removed from the virtual RDF graph database;
  applying the stream of tuples on the first RDF graph database of the virtual RDF graph database;
  applying the batch of tuples on the second RDF graph database of the virtual RDF graph database by:
    computing a snapshot of the second RDF graph database, including the batch of tuples, the computing guarantying ACID property of the snapshot by sequences of concurrency control operations duly executed using consistent write of the file storage;
    storing, on the file storage, the computed snapshot; and
    registering the computed snapshot in the catalog, thereby obtaining an updated description of the virtual RDF graph database.
  The method may comprise one or more of the following:
  an ALTER REFRESH command performs the sequences of concurrency control operations duly executed, the ALTER REFRESH command ensuring the ACID properties of an update on the second RDF graph database of the virtual RDF graph database, the ALTER REFRESH's sequences of concurrency control operations comprising: uniquely identifying a last snapshot of the second RDF graph database, the last snapshot representing a state of the snapshot formed by the second RDF graph database at a given time; verifying that no other ALTER REFRESH command is executed simultaneously, else stopping the ALTER REFRESH command and retaining the ALTER REFRESH command being already executed; obtaining a list of the files in a stage of all snapshot(s), including the last snapshot; filtering the files of the list of the files in the stage of the last snapshot, thereby obtaining a snapshot list naming files of the last snapshot to be made available for a subsequent access to the database, at the given time; writing the names of the files of the snapshot list, thereby obtaining a new snapshot that is unregistered in the catalog; uploading to the stage a file of the new snapshot; registering the new snapshot in the catalog after the catalog has identified, in an ACID transaction, the new snapshot as being the last snapshot on which the batch of tuples is to be applied;
obtaining the snapshot list naming files of the last snapshot to be made available for a subsequent access to the database, at the given time, comprises: obtaining a list of the name(s) of valid partition(s); for each partition named in the list of valid partition(s): verifying if a current update operation on the partition is still pending, and if yes, adding the partition to a list of valid partition(s) for which a current update operation(s) is still pending; verifying if a past update operation on the partition has not been successfully achieved, and if yes, verifying, in the catalog, if a snapshot on which the unsuccessful update operation had been performed was registered in the catalog: if not, ignoring the unsuccessful update operation; if yes, removing the partition from the list of the valid partition(s) for which an update operation(s) is pending; creating an empty snapshot list file, and completing the snapshot list file by adding: the name(s) of the file(s) of the valid partition (s) of the list of valid partitions for which a current update operation(s) is still pending; else the name(s) of the file(s) of the valid partition(s) of the list of the name(s) of the valid partition(s) if the list of valid partition(s) for which a former update operation(s) is still pending is empty; thereby obtaining the snapshot list naming file(s) of the last snapshot to be made available for a subsequent access to the database, at the given time; and verifying that each file listed in the snapshot list is present in the stage.
the obtaining a list of the name(s) of valid partition(s) comprises searching in the file storage, for each partition, for a file named with the partition name and a specific extension called VALID_EXTENSION, the VALID_EXTENSION file storing the name(s) of the file(s) of the partition, the VALID_EXTENSION file having been uploaded to the file storage at the time of a creation of the partition; and/or the obtaining a list of the name(s) of valid partition(s) comprises searching, for each partition, in the file storage, for a file named with the partition name and a specific extension called TOMBSTONE_EXTENSION, the TOMBSTONE_ EXTENSION file storing the name(s) of the file(s) of the partition that are object of a current delete operation, the TOMBSTONE_EXTENSION file having been uploaded to the file storage when performing a delete operation of the partition; and/or the verifying, for each partition named in the list of valid partition(s), if a current update operation on the partition is still pending comprises searching, in the file storage, for each partition, for a file named with the partition name and a specific extension called PENDING_EXTEN- SION, the PENDING_EXTENSION file storing the name(s) of the file(s) of the partition that are object of the current update operation, the PENDING_EXTENSION file having been uploaded to the file storage when performing the current update of the partition; and/or the verifying, for each partition named in the list of valid partition(s), if a past update operation on the partition has not been successfully achieved comprises searching in the file storage, for each partition, for a file named with the partition name and a specific extension called CONSUMED_EXTENSION, the CONSUMED_EXTENSION file storing the name(s) of the file(s) of the partition that were object of the past update operation, the CONSUMED_EXTENSION file having been uploaded to the file storage when performing the past update of the partition;

the verifying, for each partition named in the list of valid partition(s), if a past update operation on the partition has not been successfully achieved further comprises: verifying that the content of the PENDING_EXTENSION file is coherent with the content of the VALID_EXTENSION file, and if not, considering that the list of the files of the last snapshot is the content of the VALID_EXTENSION file; and wherein the PENDING_EXTENSION file is ignored for the verifying, for each partition named in the list of valid partition(s), if a current update operation on the partition is still pending; uniquely identifying the last snapshot of the second RDF graph database comprises obtaining the last dataset snapshot identifier from the catalog and keeping in memory the last dataset snapshot identifier as a previous dataset snapshot; and wherein registering the new snapshot in the catalog further comprises: verifying, by the catalog in an ACID transaction, that the last snapshot described in the catalog is the previous dataset snapshot: if yes, registering the new snapshot in the catalog as being the last snapshot on which the batch of tuples is applied; if no, determining that a concurrent ALTER REFRESH command is executed and removing the new snapshot file from the stage;

an ALTER PARTITION command performs further sequences of concurrency control operations for the update of a partition of the second read-only RDF graph database, the ALTER PARTITION command being performed before the ALTER REFRESH command, the ALTER PARTITION's sequences of concurrency control operations comprising: downloading, from the stage, the VALID_EXTENSION file of the valid partition to be updated, thereby obtaining the name(s) of the file(s) of the valid partition; verifying that no ALTER PARTITION command is executed simultaneously on the valid partition, else stopping the ALTER PARTITION command and retaining the ALTER PARTITION command being already executed; creating a PENDING_EXTENSION file storing the name(s) of the file(s) of the valid partition that is object of the current update operation, the name(s) of the file(s) of the valid partition being object of the current update operation and being obtained from the batch of tuples; and uploading the PENDING_EXTENSION file to the stage;

the snapshot of the second RDF graph database comprises a set of batched partitions, one or more batched partitions being split into fragments, the creating the PENDING_EXTENSION file comprising: determining if the batch of tuples is a Change Data Capture, (CDC) file, and performing: if the batch of tuples is not a CDC file, generating fragments of the batch of tuples, thereby obtaining a list of fragment files; else if the batch of tuples is a CDC file, for each for each add/delete triple of the CDC file, locating the fragment of one of the one or more batched partition to which to which the add/delete operation will be applied, thereby obtaining a list of fragments with an additional list of delta files, if any; and wherein the creating the PENDING_EXTENSION file comprises creating the PENDING_EXTENSION storing the list of fragments with an additional list of delta files, if any;

an ADD PARTITION command performs further sequences of concurrency control operations for an adding of a partition on the second read-only RDF graph database, the ADD PARTITION command being performed before the ALTER REFRESH command, the ADD PARTITION's sequences of concurrency control operations comprising: uploading, to the storage, a VALID_EXTENSION file of the partition to be added, a successful uploading of the VALID_EXTENSION file indicating that no partition with a same name exists of the file storage; —generating fragments of the batch of tuples for the addition of the partition on the second read-only RDF graph database, thereby obtaining a list of fragment files; storing the list of fragments in the VALID_EXTENSION file and uploading the VALID_EXTENSION to the stage;

a REMOVE PARTITION command performs further sequences of concurrency control operations for removing a partition of the second read-only RDF graph database, the REMOVE PARTITION command being performed before the ALTER REFRESH command, the REMOVE PARTITION's sequences of concurrency control operations comprising: verifying, on the stage, if the partition to be removed exists, and if not, stopping the REMOVE PARTITION command; uploading to the stage a TOMBSTONE_EXTENSION file, a successful uploading confirming that the partition to be removed of the second read-only RDF graph database exists;

latching the second read-only RDF graph database stored on the file storage, the latching being performed before obtaining in the stage the list of the files of the last snapshot; unlatching the new snapshot after its registering in the catalog;

latching the second read-only RDF graph database comprises: uploading to the file storage a file named with the last dataset snapshot name and a specific extension called START_EXTENSION; verifying, at the uploading the file of the new snapshot in the stage and at each subsequent steps, the presence in the file storage of the START_EXTENSION file; and wherein unlatching the new snapshot after its registering in the catalog comprises verifying the presence in the file storage of the START_EXTENSION file and removing the START_EXTENSION file;

the file storage is a distributed file storage and/or the first RDF graph database is stored on an in-memory data structure;

the catalog for storing metadata is stored on a database ensuring ACID properties and strong consistency.

It is therefore provided a computer-implemented method of executing, with isolation guaranty, a triple pattern of a SPARQL query on a virtual RDF graph database previously updated, the method comprising:

obtaining a last registered snapshot of a virtual RDF graph database described in the catalog;

for the triple pattern obtained, executing the triple pattern on the first RDF graph database of the virtual RDF graph database and on the obtained last snapshot, thereby guarantying isolation of the execution of the triple pattern.

It is further provided a computer program comprising instructions for performing the method for updating and/or the method for of executing.

It is further provided a computer readable storage medium having recorded thereon the computer program.

It is further provided a system comprising a processor coupled to a memory, the memory having recorded thereon the computer program.

It is further provided a device comprising a data storage medium having recorded thereon the computer program. The device may form or serve as a non-transitory computer-readable medium, for example on a SaaS (Software as a service) or other server, or a cloud based platform, or the like. The device may alternatively comprise a processor coupled to the data storage medium. The device may thus form a computer system in whole or in part (e.g., the device is a subsystem of the overall system). The system may further comprise a graphical user interface coupled to the processor.

BRIEF DESCRIPTION OF THE DRAWINGS

Non-limiting examples will now be described in reference to the accompanying drawings, where:

FIG. 1 shows a flowchart of an example of the method for updating a virtual RDF graph database;

FIG. 4 shows a table with examples of commands; and

FIG. 5 shows an example of modifications of triples; and

DETAILED DESCRIPTION

Figure 2:
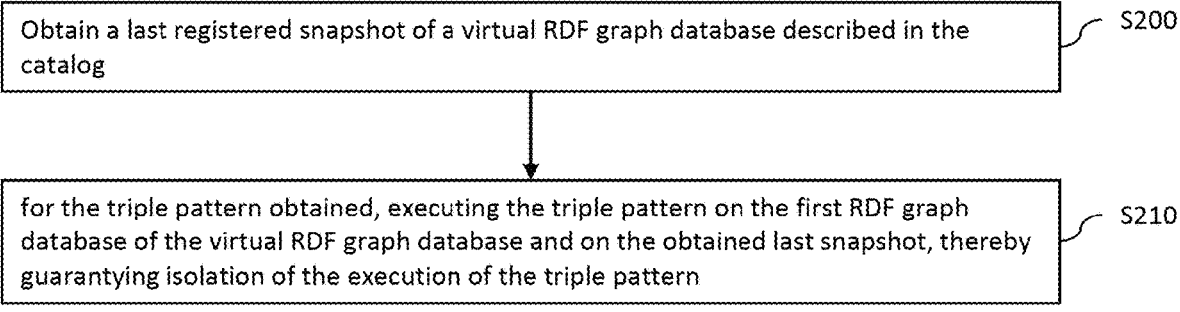
FIG. 2 shows a flowchart of an example of the method for querying the updated virtual RDF graph database.

With reference to the flowchart of FIG. 1, there is described a computer-implemented method for updating a virtual RDF graph database. "Virtual RDF graph database" means that at least two graphs are seen as one logically equivalent RDF graph database, which excludes relational databases that might be adapted to expose the content of arbitrary relational databases as knowledge graphs, such as github.com/ontop/ontop. The virtual RDF graph database comprises RDF tuples (or simply tuples). The method comprises providing a file storage having a durability D property of ACID property. The file storage is distributed or not. The file storage guaranties consistent write. "Consistent write" relates to a consistency model, which describes the conditions under which write operations from one client become visible to other clients. Consistent write may be also referred to as "Strong Read-After-Write Consistency", which is discussed here aws.amazon.com/fr/blogs/aws/amazon-s3-update-strong-read-after-write-consistency/. In the present disclosure, "Consistent write" means that the readers are guaranteed to see all previously committed writes. The method further comprises providing a virtual RDF graph database. The virtual RDF graph database comprises a first RDF graph database updatable by streams of tuples to be added to and/or removed from the first RDF graph database, and a second read-only RDF graph database stored on the file storage and updatable by batches of tuples to be added to and/or removed from the second RDF graph database, thereby forming a snapshot that is a read-only and updatable. The method further comprises providing a catalog for storing metadata describing the second read-only RDF graph database on the file storage, the catalog being compliant with ACID. Next, the method further comprises obtaining a stream of tuples to be added to and/or removed from the virtual RDF graph database and obtaining a batch of tuples to be added to and/or removed from the virtual RDF graph database. The method also comprises applying the stream of tuples on the first RDF graph database of the virtual RDF graph database. In addition, the method comprises applying the batch of tuples on the second RDF graph database of the virtual RDF graph database. The applying is performed by computing a snapshot of the second RDF graph database, including the batch of tuples, the computing guarantying ACID property of the snapshot by sequences of concurrency control operations duly executed using consistent write of the file storage, storing, on the file storage, the computed snapshot and registering the computed snapshot in the catalog, thereby obtaining an updated description of the virtual RDF graph database. Catalog refers to a collection of metadata and information about resources of the virtual RDF graph database.

Advantages of the present method will be provided in what follows.

Using the terminology from the W3C of www.w3.org/TR/rdf11-concepts/, "RDF data" is defined as triples inside RDF graphs. From www.w3.org/TR/sparql11-query/#rdf-Dataset, a "RDF dataset" is a collection of such RDF graphs, and an RDF database is a collection of RDF datasets. Still using the terminology known in the art (en.wikipedia.org/wiki/Partition_(database)), "a partition is a division of a logical database or its constituent elements into distinct independent parts". Situations with overlapping partitions will be discussed later.

As discussed in the background section, a database can be seen as made of compute (for query processing) and database storage. In the present disclosure, compute and database storage are considered as separated resources that scale differently.

The present disclosure focuses on the database storage, and it is considered that the way the compute is managed is out of the scope of the present disclosure. The way the present disclosure achieves obtaining an improved RDF heterogeneous distributed storage made mainly of non-ACID compliant storage that is able to execute a SPARQL query, including update/delete of triples, with ACID guarantees, is independent of the way the computed is managed. Incidentally, the compute may be distributed or not. For simplicity, it is considered that the compute part is not distributed, but it could be distributed without changing the disclosure as the disclosure is independent of the way the computed is managed. In the situation the compute is distributed, the catalog is distributed too.

Furthermore, RDF data of a given RDF dataset is partitioned in a distributed storage with a given partitioning rule that may be, e.g., hashing on the subject. There exist many ways to partition RDF data, it is not the subject of the disclosure. The sole requirement is to know which quad is in which partition. Thus, it is considered that a mean exists to probe a partition during query execution to know if the partition may be used in the execution flow, e.g., with statistics.

The notion of quad is now discussed. In examples, the RDF tuples of the RDF dataset may be RDF quads. An RDF quad may be obtained by adding a graph label to an RDF triple. In such examples, an RDF tuple includes the RDF graph. A standard specification has been published by W3C to specify RDF Quads (also referred to as N-Quads), see for example "RDF 1.1 N-Quads, A line-based syntax for RDF datasets", W3C Recommendation 25 Feb. 2014. An RDF quad may be obtained by adding a graph name to an RDF triple. A graph name may be either empty (i.e., for a default or unnamed graph) or an IRI, i.e., a graph IRI. In examples, a predicate of the graph may have a same IRI as the graph IRI. The graph name of each quad is the graph that the quad is part of in a respective RDF dataset. An RDF dataset, as known (e.g., see www.w3.org/TR/rdf-sparql-query/#rdf-Dataset) represents a collection of graphs. For the sake of simplicity, a quad can be sum up as a triple that includes a reference to a graph.

Referring back to FIG. 1, the method updates a virtual RDF graph database. As mentioned earlier, the virtual RDF graph database comprises at least two graphs are seen as one logically equivalent RDF graph database. Thus, updating the virtual RDF graph database means updating a logical database.

The providing S100 is now discussed.

The File Storage

The method provides a file storage having a durability D property of ACID property. As known, "file storage" means storing and organizing data in the form of files within a file system. Data are grouped into individual files, each identified by a unique name or path, and these files are organized hierarchically within directories or folders. As known, "durability property" of ACID property ensures that once a transaction is committed, the changes made to the data persist and survive any subsequent failures, such as system crashes or power outages. This means that once a file write or file update operation is acknowledged as successful, the data is safely stored and will not be lost even in the event of a failure. "A transaction is committed" means that the changes made by the transaction are finalized, and the system ensures their permanence and visibility to other transactions.

The file storage is distributed or not. In a distributed file storage system, files and data are distributed across multiple servers or storage nodes. The distribution of files is often done for scalability, fault tolerance, and improved performance. For example, Hadoop Distributed File System (HDFS), Google File System (GFS) are examples of distributed file systems. Many cloud storage solutions, such as Amazon S3, Google Cloud Storage, and Microsoft Azure Storage, are distributed file storages in nature. In a non-distributed file storage system, also referred to Centralized File Storage, all files and data are stored on a single server or a limited set of servers. Users and clients access files by connecting to this central server. All file requests and data retrieval go through this central point.

The file storage guaranties consistent write. As known, "consistent write" refers to a write operation that ensures the consistency of the data, that is, the readers are guaranteed to see all previously committed writes.

The Virtual RDF Graph Database

Still at S100, a virtual RDF graph database is provided. As known, a "virtual RDF graph database" refers to a database system that provides a virtual approach to querying and accessing RDF. The term "virtual" indicates that the database is capable of querying and retrieving data from multiple distributed sources or endpoints. It is to be understood that the virtual RDF graph database comprises at least two RDF graphs databases that are seen as one logically equivalent RDF graph database; this definition excludes relational databases that might be adapted to expose the content of arbitrary relational databases as knowledge graphs, such as github.com/ontop/ontop. Instead of consolidating all data into a single physical database, a virtual RDF graph database allows querying data from various distributed sources as if they were part of a single integrated database.

The virtual RDF graph database comprises two RDF graph databases that are now discussed.

The First RDF Graph Database

The virtual RDF graph database comprises a first RDF graph database. The first RDF graph database is updatable by streams of tuples to be added to and/or removed from the first RDF graph database. As known, streaming modifications is a way for an RDF dataset to ingest RDF data, that is, for updating the RDF dataset. The update is made with low latency using standard SPARQL update queries; add and delete of triples and/or add and delete of graphs are made on the same dataset and instantly available. In other words, it can be seen as if one or more partitions offer the same modification capabilities as a standard graph database that would not have a distributed storage. These partitions are also referred to as "dynamic partitions". It is reminded that the term "partition" has been defined as "a division of a logical database or its constituent elements into distinct independent parts". In the context of streaming modifications, standard SPARQL updates on the RDF datasets are applied to the partitions of the database, which can be modified as any other graph database.

The Second RDF Graph Database

The virtual RDF graph database comprises a second RDF graph database. The second RDF graph database is stored on the file storage. The second RDF graph database is read-only, which means that no update operations can be made directly on the dataset; the second RDF graph database is thus a snapshot, that is, a static, point-in-time representation of the RDF data of the second RDF graph database. The second RDF graph database is updatable by batches of tuples to be added to and/or removed from the second RDF graph database. Hence, the second RDF graph database forms a snapshot that is a read-only, but also updatable by batches. In the initial situation—which is the second RDF graph database has never been updated by a batch of tuples to be added to and/or removed from the second RDF graph database—, the second RDF is a snapshot. For an update by batch, a batched partition will accompany the second RDF graph database (e.g., under the form a Delta file as discussed hereinafter), so that the snapshot may comprise two or more snapshots. In the following discussion, the term snapshot may encompass the initial situation (one snapshot of the second RDF graph database) or the situation in which the updated second RDF graph database comprises several snapshots. Batch partition is now discussed.

As known, updates by batches refers to batch loading. Batch loading means loading data from RDF files into a partition called a "batched partition" (also referred to as archived partitions). The RDF files comprise the tuples to be added to and/or removed from the second RDF graph database. The RDF files may be of any format, e.g., in Turtle format—discussed here www.w3.org/TR/turtle/—, or TriG—discussed here www.w3.org/TR/trig/or equivalent-. Thus a batch stores updates to be applied on the second RDF graph database, and a batched partition stores updates that have been applied on the second RDF graph. In both cases, the snapshot itself is not directly affected by the modifications as the snapshot is read-only. The applied modifications are supported by the batched partitions only. Batched partitions can be added, removed or altered to the dataset.

The second RDF graph database is a read-only snapshot. A dataset snapshot is composed of the location of all the files, their metadata and optional delta files in the distributed storage. Location of all the files means that the snapshot includes information about the location of all the files in the dataset. This information indicates where each file is stored within the distributed storage infrastructure. This may involve references to specific storage nodes, addresses, or paths. Metadata of the snapshot refers to additional information about the characteristics, origin, and structure of the RDF graph database. For example, metadata may comprise, but not limited to, bibliographic information of the RDF graph database (e.g., title, author, creation date, modification date . . . ), the format in which the RDF data is encoded (e.g., turtle, TriG . . . ), triple count, SPARQL Endpoint, storage location . . . . Thus Metadata may provide context and facilitate the organization and management of the dataset. A delta file represents the changes or differences between two versions of the data. Including optional delta files in a dataset snapshot allows for efficient tracking of changes over time. These delta files may contain information about updates, additions, or deletions made to the dataset since the last snapshot. The inclusion of optional delta files may be particularly useful for minimizing the amount of data that needs to be transferred or stored when creating snapshots, as it captures only the changes since the previous snapshot. For the sake of explanations only, one notices that, when a new snapshot is computed, there is no need to duplicate the entire previous snapshot as the algorithms can access references (e.g., the paths) to old data files that are still valid, and the references to the new data file(s). In addition, Delta files do no need to regenerate an entire data file when just a few triples have been modified. These two mechanisms work separately to avoid duplicating the entire snapshot.

In examples, a batched partition may be split into n fragments to minimize the impact of an update, with n that is a positive integer (n≥1). Splitting the partition into fragments means dividing the partition into a set of subgraphs, where each subgraph is called fragment. Here subgraph means a subset of triple of the partition. The batched partition comprises the tuples that are added to and/or removed from the second RDF graph database and it is decomposed into subgraphs, the fragment. This amounts to say that a SPARQL query causing the generation of a batch of tuples to be added to and/or removed from the second RDF graph database is decomposed (e.g., in a random way) into subgraphs (that is, into subset of triples) that are then executed over the second RDF graph database. This split into fragments of the batched partition is an optimization and not required.

Fragment may be used in situation where the overall size of a batched partition is too important, e.g., the size of the batched partition is larger than a predetermined size (for instance more than one gigabyte). The number of fragments may be determined depending on the fragmentation strategy, e.g., a maximum size of the fragments, parallel processing of the fragments and so on.

In examples, small partitions may be merged into one bigger fragment to control resource usage, e.g., file handles. The number of small partitions to be merged may be determined depending on at merging strategy, e.g., a minimum size of the partition. This merge of small partition into one bigger fragment is an optimization and not required.

Still in these examples, a fragment is made of an RDF data file where the RDF data file may be a binary file or not. The fragment also comprise metadata of the RDF data file (e.g., statistics) and optional delta files.

Therefore, the virtual RDF graph database is separated into two logical parts: the first RDF graph database that is updatable with standard SPARQL updates, called the dynamic partition(s), and the second RDF graph database that is a read-only snapshot and that can be updated by loading of batch of files, called the batched partition(s). As previously discussed hereinabove, the second RDF graph database may comprise one or more snapshots.

Updates of the First RDF Graph Database

Standard SPARQL updates on the virtual RDF datasets are applied to the first RDF graph database (also referred to as dynamic partition(s)), which can be modified as any other graph database. The same RDF graphs can appear in both batched and dynamic partitions. A given triple can exist in only one partition, be it batched or dynamic, otherwise partitioning rules are violated. Indeed, a partition is defined as "a division of a logical database or its constituent elements into distinct independent parts"—en.wikipedia.org/wiki/Partition_(database)—. This restriction may be lifted at the cost of a higher complexity, either inside the query engine, or as post-processing of the results outside of the database. Indeed, if triples were present in more than one partitions this would lead to the two following defects:

for read queries: some results would be duplicated if they are generated by some triples present in multiple partitions (thus generated multiple time);

for write queries: if a triple existing in multiple partitions must be deleted, the deletion must be propagated to all partitions. Otherwise, the triple will still be seen by subsequent queries. This restriction may be lifted without changing the disclosure. This restriction may be implemented as known in the art.

Updates of the Second RDF Graph Database

The second read-only RDF graph database is stored on the file storage and is updatable by batches of tuples to be added to and/or removed from the second RDF graph database. The second read-only RDF graph database forms an initial snapshot. The batches of tuples arrive progressively (that is, for each new update of the initial snapshot) and, together with the initial snapshot, form a new snapshot. This new snapshot is defined as the state of the batched partitions of the second RDF graph database at a given time. This state is defined by all batched partitions, which means all the fragments (if one or more partitions have been split into fragments); that is to say, all the RDF files with their metadata stored in the distributed storage. The snapshot is then composed of the locations of all the files, their metadata and optional delta files in the file storage. As discussed, the delta files represent the changes or differences between two versions of the data.

The Catalog

The method provides S100 a catalog for storing metadata describing the second read-only RDF graph database on the file storage. The catalog is compliant with ACID, which meant that i) operations involving the addition, modification, or deletion of metadata entries are performed as atomic transactions. If any part of the operation fails, the entire operation is rolled back to maintain a consistent state. ii) The catalog system enforce consistency rules (in the meaning of consistent write) for metadata. This ensures the uniqueness, at a given time, of the dataset snapshot defined as "the last one". iii) Multiple transactions modifying metadata concurrently do not interfere with each other. iv) Any changes made to the catalog's metadata is durable. This typically involves that changes are written to non-volatile storage. "The last one snapshot" means the new snapshot previously discussed.

The catalog is able to register the metadata of the datasets in an ACID way using any language available, since these metadata are just key/value pairs, with a strong consistency model. Strong consistency is for example discussed here en.wikipedia.org/wiki/Strong_consistency. By "consistency model" it is meant the "consistency" as in consistency model of the CAP theorem in this link: apple.github.io/foundationdb/consistency.html.

Regarding the consistency provided by the catalog, there may be several dataset snapshots stored at a given time, but only one is said to be "the last one". The last one means the snapshot that comprises all the batched partitions received until now.

In examples, the catalog may be implemented by, but is not limited to, a distributed key/value store with ACID transactions and strong consistency such as FoundationsDB (apple.github.io/foundationdb/index.html), or a NewSQL database such as MariaDB in the open source world: mariadb.com/—MariaDB may be distributed with Xpand presented here mariadb.com/products/enterprise/xpand/—, or any RDF database.

In examples, all the dataset snapshots metadata may be stored in the catalog. Alternatively, all the dataset snapshots metadata may be saved as a file in the distributed storage and the catalog keeps only the location of this file.

The principle of operations of the catalog are now discussed. When a transaction begins, the catalog fetches the last dataset snapshot metadata from the catalog. This last snapshot is used for all its queries until the end of the transaction.

When a partition is added, removed or altered, it ends up adding a new partition—or fragments if splitting is used-and/or removing the previous one—or fragments with potentially with delta files if splitting is used-. When all these operations are made successfully on the distributed storage, a new dataset snapshot can be created. Interestingly, the file storage guaranties consistent write, and therefore the success of the update operations.

When all these operations are made successfully on the distributed storage, they are atomically registered as "the last one" inside the catalog. Therefore, all new transactions will use a new dataset snapshot and previous transactions will continue to use their previous dataset snapshot. This guarantees ACID properties, thanks to the ACID guarantees of the catalog and of the atomicity, durability and strong consistent write of the distributed storage. Old dataset snapshots and the corresponding unused partitions (or fragments and potential delta files if splitting is used) may be removed from the distributed storage either when all transactions using them are ended, or asynchronously in a garbage collect pass.

As seen, the catalog holds only metadata and not data, it will not hold the same order of magnitude of data as in the dataset (i.e., billions of triples); therefore, the costs, in terms of computing resources and memory, to maintain this catalog will be far less. The catalog may be shared by several datasets.

Figure 3:
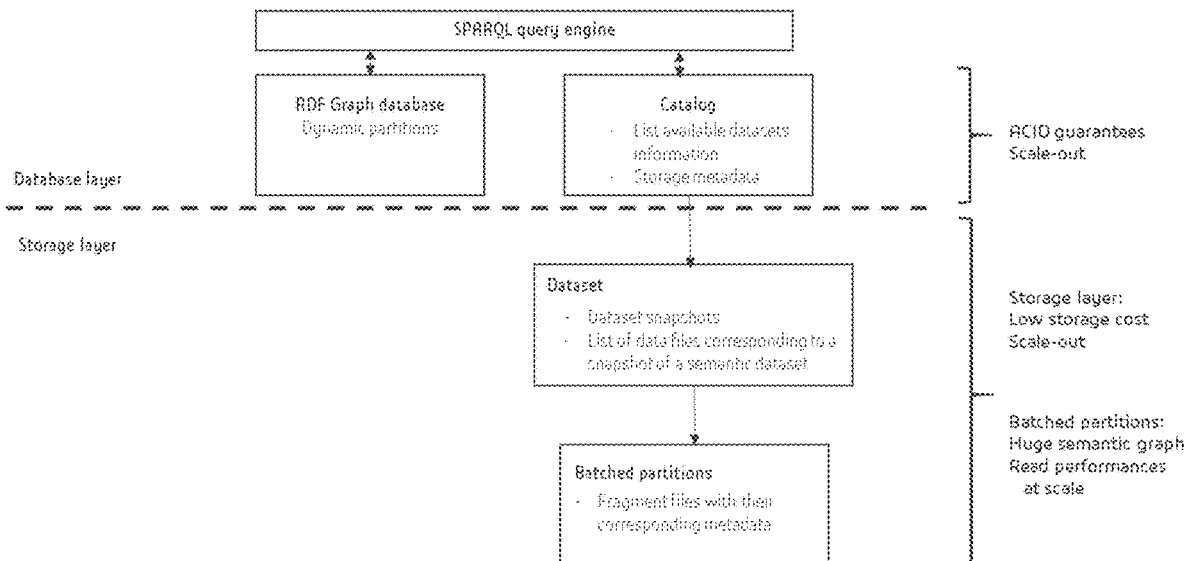
FIG. 3 shows an example of the distributed architecture.

In reference to FIG. 3, it is shown an example of a scheme of an architecture of the provided S100. The architecture comprises two layers. A top layer is the database layer that manages the RDF dataset. The layer below is the storage layer that stores the RDF dataset and the batched partitions.

On the database layer, the first RDF graph database updatable by streams is represented and can be queried by a SPARQL query engine. The catalog that stores metadata describing the second read-only RDF graph database on the file storage, can also be queried by a SPARQL query engine;

for the sake of explanations only, the SPARQL query engine does not necessarily rely on a SPARQL query to use the catalog, for example if the catalog is key/value base or a SQL database. It is assumed that the SPARQL query engine knows which interface/query language to use to interact with the catalog. As shown, the catalog stores information regarding the snapshot that can be accessed; it lists available dataset information. The catalog is also in charge of maintaining metadata information of the snapshots.

On the storage layer, the snapshots of the dataset (e.g., the second read-only RDF graph database) are stored on the file storage ensuring strong consistency write. For at least the last snapshot referenced on the catalog, the list of data files of the snapshot is stored. It is to be understood that the file storage may store several lists of data file, each list corresponding to a respective snapshot. Still on the storage layer, the batched partitions are stored, representing the updates applied on the snapshot(s).

The batched and dynamic partitions (respectively the second read-only RDF graph database stored on the file storage and the first RDF graph database) constitute one RDF dataset (the virtual RDF graph database, which comprises at least two RDF graphs databases that are seen as one logically equivalent RDF graph database). The SPARQL query engine executes queries on all the partitions and sees them as one logical database. Read queries are made on all partitions with ACID guarantees. SPARQL update queries are executed only on the dynamic partitions, with no restrictions on what kind of updates are done.

Still in reference to the example of FIG. 3, the dynamic partition is stored on an in-memory data structure, while the batched partitions are stored on a file storage guarantying consistency write, the file storage being distributed or not. In this example, the SPARQL query engine executes the query on a heterogeneous distributed storage.

When a SPARQL query is executed, the execution of the query respects two main constraints: 1/ the RDF dataset is dynamic (data can be added or removed), and 2/ the SPARQL query is executed in an ACID way, especially regarding isolation since the RDF dataset is dynamic.

It is to be understood that the batched partitions might be located on a standard file system, e.g., the Unix file system, instead of a distributed object storage.

Referring back to FIG. 1, at S110, are obtained a stream of tuples to be added and/or removed to the virtual RDF graph database and a batch of tuples to be added and/or removed to the virtual RDF graph database. The order in which they are obtained is irrelevant. They may even be received at the same time.

Next, at S120, the stream of tuples is applied on the first RDF graph database of the virtual RDF graph database.

Then, at S130, the batch of tuples is applied on the second RDF graph database. In other words, a batched partition will be created as a result of the applying. To that aim, the following steps are performed.

Firstly, a snapshot of the second RDF graph database is computed. The computing includes the batch of tuples so that a new snapshot is obtained. During the computing operations leading to the generation of the new snapshot, ACID property is guaranteed by sequences of concurrency control operations duly executed using consistent write of the file storage on which the second RDF graph database is stored.

"By concurrency control operations guarantying ACID properties" is meant that, for each transaction, the partition(s) of the dataset snapshot fetched at the beginning of the transaction is(are) always kept available during the span of a transaction, and thus not modified by concurrent add/remove/alter. The concurrency control operations rely on properties of the catalog that has ACID transactions, the file storage has read-after-write consistency after a create/overwrite/delete of an object, meaning "any subsequent read request immediately receives the latest version of the object", and the external storage can upload a file and fail with certainty if the file already exists. Examples of implementations of algorithms ensuring "concurrency control operations guarantying ACID properties" will be described hereinafter.

Once computed, the snapshot is stored on the file storage.

Finally, the snapshot is registered in the catalog so that an updated description of the virtual RDF graph database is stored in the catalog; the updated description of the virtual RDF graph database thus comprises an updated description of the first and second RDF graph databases. This new snapshot may be used for applying a new batch of tuples.

At this step, SPARQL queries may be executed, where SPARQL queries may include update queries, with ACID guarantees on RDF data partitioned on a heterogeneous distributed storage made mainly of non-ACID compliant storage. The data of the update query may be ingested either with batches of data files from a distributed storage, or as streaming modifications of triples directly on the ACID database.

In examples, the approach may be accessed through API, or it may be accessed through SPARQL commands as an extension of the norm. Both are possible, yet for the sake of clarity only, some commands are now discussed as an extension of SPARQL to manipulate an RDF dataset as discussed in reference to FIG. 1. It is to be understood that the disclosure is not restricted to these commands; especially the actual grammar are for the purpose of the discussion only. FIG. 4 provides a summary of commands that will be discussed thereafter.

In examples, an ALTER REFRESH command may perform the sequences of concurrency control operations to be executed. The ALTER REFRESH command ensures the ACID properties of an update on the second RDF graph database of the virtual RDF graph database. The purpose of the ALTER REFRESH is to create a new dataset snapshot based on the current state of the dataset and refresh the list of available dataset snapshot definitions.

As an introduction of the ALTER REFRESH command, one notes that the ALTER REFRESH command is responsible to ensure the ACID properties of the manipulation of the dataset. The manipulation of the dataset may comprise, but is not limited to, the addition of a partition on the dataset, e.g., with an ADD PARTITION command, the removing of a partition of the dataset, e.g., with a REMOVE PARTITION command, the alteration (that is a modification) of a partition, e.g., with an ALTER PARTITION command. This is summarized in FIG. 4.

As already discussed, the dataset snapshot can be defined as the state of the dataset at a given time. This state is defined by all partitions, which means the dynamic and the batched partitions. As seen previously, the batched (the read-only RDF graph database stored on the file storage) and dynamic partitions (first RDF graph database updatable by streams) are modified by separated commands. As dynamic partitions are by definition modified in a streaming way, their modifications are immediately visible. Batched partitions are, also by definition, modified by batch. When a transaction begins on the dataset, it fetches the last snapshot from the catalog. This snapshot is used for all its queries until the end of the transaction.

When the ALTER REFRESH command is executed, all partitions constituting all the batched partitions may be listed in the stage of the dataset. It is reminded that the partitions may be fragmented for the purpose of improving performances of the SPARQL queries; in this case, all fragments constituting all the batched partitions are listed in the stage of the dataset. As known, processing datasets in stages is a common approach; the stage of the dataset models a location where the files constituting the dataset are stored. For example, A definition of "stage" is provided docs.snowflake.com/en/sql-reference/sql/create-stage.

This list of partitions is saved in the so-called dataset snapshot, identified by a unique name. This dataset snapshot is saved by an ACID transaction on the catalog and registered as the "last snapshot" or "last available snapshot". Therefore, all new transactions will use the new dataset snapshot loaded in the stage and previous transactions will continue to use their previous dataset snapshot. This guarantees ACID properties, thanks to the ACID guarantees of the catalog and of the atomicity, durability and consistent write of the distributed storage.

Each transaction has its own list of partitions (or fragments depending on the case) thanks to the dataset snapshot fetched at the beginning of the transaction. To be able to have ACID transactions on the dataset, these partitions (or fragments depending on the case) are available during the span of a transaction and thus not modified by concurrent add/remove/alter partition nor by concurrent alter dataset refresh. To achieve this, the ALTER REFRESH command relies on three capabilities: 1/the catalog has ACID transaction, 2/ the external storage has read-after-write consistency after a create/overwrite/delete of an object, meaning "any subsequent read request immediately receives the latest version of the object", and 3/ the file storage can upload a file and fail with certainty if the file already exists.

In examples, the first control operation of the ALTER REFRESH command is to uniquely identify a last snapshot of the second RDF graph database. As already discussed hereinabove, the last snapshot is the snapshot including all the batched partitions received at the time the ALTER REFRESH command starts its execution. The last snapshot thus represents the snapshot formed by the second RDF graph database and its batched partitions. It is to be understood that the last snapshot may include no batched partitions, e.g., no batch of tuples to be added and/or removed to the virtual RDF graph database has been received at the time the ALTER REFRESH command starts its execution. Uniquely identifying means that the last dataset snapshot identifier is retrieved or obtained from the catalog.

The next control operation of the ALTER REFRESH command may comprise verifying that no other ALTER REFRESH command is executed simultaneously. If yes, then the ALTER REFRESH command is stopped and the ALTER REFRESH command that is already executed is retained. This contributes to ensure ACID transactions on the last snapshot.

The next control operation of the ALTER REFRESH command may comprise obtaining a list of the files in a stage of all snapshot. This operation is done once and the whole list may be copied in the memory of the process. This list is used for the rest of the ALTER REFRESH command. It is reminded that this operation of listing the files in the stage is strongly consistent, as per the consistent write properties of the file storage. This means that the files of the stage that are listed are visible to any or all processes using this data; any subsequent read operations on the last snapshot reflect this data.

The next control operation of the ALTER REFRESH command may comprise filtering the file of the list of the files in the stage of the last snapshot. Filtering consists in checking that the files in the list are valid in the sense that no other operation is running on them. The filtering guaranties that Isolation of ACID property is met, and therefore that no concurrent operation will interfere on the files of the list. In other words, the view on the last snapshot of the database is consistent and reliable. As a result of the filtering, is obtained a "snapshot list" that is a file naming files of the last snapshot to be made available for a subsequent access to the database, at the given time. Hence, the "snapshot list" comprises the partitions that have not been updated (that is, unmodified) and the updates that have been performed since the last ALTER REFRESH command; the updates that have been performed since the last ALTER REFRESH command "snapshot list" are invisible yet for any subsequent action on the database. Subsequent access comprises, but is not limited, SPARQL queries, tuples to be added to and/or removed. Here the given time is the moment at which the ALTER REFRESH command has started its execution.

The next control operation of the ALTER REFRESH command may comprise writing the names of the files of the "snapshot list". Here the term "name" implies that the dataset snapshot, identified by a unique name, is loaded in the stage.

"Writing the names of the files of the "snapshot list" means that a new snapshot is obtained from the former one where all the files of the former snapshot are to be made available for a subsequent access to the database, at the given time. In other words the name of all the files of the "snapshot list" are written in a file of the new dataset snapshot.

Any know techniques may be used for performing the writing. For example, this can be done using with a real semantic, e.g., using RDF format in a turtle file, a TriG format. Alternatively, any known technique for performing the writing may be used, e.g., a simple list of file names.

The next control operation of the ALTER REFRESH command may comprise uploading to the stage a file of the new snapshot. The uploaded new snapshot comprises the files named in the "snapshot list" file.

The new snapshot is not registered yet. This means that the new snapshot is unknown to the catalog, and therefore no SPARQL query (e.g., a SELECT) may be performed on the new snapshot that comprises the latest data. The registering is performed in an ACID transaction. The ACID transaction on the catalog thus ensuring the integrity and reliability of the registration. The new snapshot is registered as the last snapshot in the catalog.

The ALTER REFRESH command having been executed, the obtained batch of tuples S 110 can be applied on the registered new snapshot (that is the last snapshot) for performing the computing S130 of the snapshot of the second RDF graph database, including the batch of tuples.

Further examples of the ALTER REFRESH command implementations are now discussed.

In examples, the obtaining the "snapshot list" naming files of the last snapshot to be made available for a subsequent access to the database, at the given time, may be performed with the following sequences of concurrency control operations.

A list of the name(s) of valid partition(s) may be obtained. The list can comprise one or more (but all) partitions of the second RDF graph database that are valid. Here "valid partition" means the partition has been correctly created and in an ACID way.

In a first example, the obtaining a list of the name(s) of valid partition(s) may comprise searching in the file storage, for each partition, for a control file that stores the name(s) of the file(s) of the valid partition. One file name may be stored, being understood that in practice a partition comprises several files and thus the control file stored the names of the files constituting the valid partition.

Control files play a significant role in managing the database's structure and metadata. They serve as a repository for essential metadata about the database, e.g., database name, file locations, log file details, timestamps, and the current database's structural integrity.

The control file may be stored on the file storage at the time the partition is batched on the file storage, that is, at the time of the creation of the partition.

In an example of the first example, the control file may be named with the partition name and a specific extension called VALID_EXTENSION. The control file is thus called VALID_EXTENSION file. The VALID_EXTENSION control file aims at identifying the records of the valid partition. The VALID_EXTENSION file stores the name(s) of the file(s) of the valid partition. The naming of the file with the partition name and the specific extension make easy the identification of the VALID_EXTENSION file of a partition.

Alternatively or additionally to the first example, in a second example, the obtaining a list of the name(s) of valid partition(s) may comprise searching in the file storage, for each partition, for a control file that stores the name(s) of the file(s) of the partition that are object of a current delete operation. Again, one file name may be stored, which is not the typical situation. This control file may be stored on the file storage at the time a delete operation of the partition has been performed on the partition.

In an example of the second example, the control file may be named with the partition name and a specific extension called TOMBSTONE_EXTENSION. The TOMBSTONE_EXTENSION control file aims at identifying the records of the partition that are object of a current delete operation. The TOMBSTONE_EXTENSION file may store the name(s) of the file(s) of the partition that are object of a current delete operation. The TOMBSTONE_EXTENSION file may be uploaded to the file storage when a delete operation of the partition starts.

The execution of the control operation that lists the name(s) of valid partition(s) having been achieved, a further control operation may comprise, for each partition named in the list of valid partition(s), the verification if a current update operation on the partition is still pending. If a current update operation on the partition is still pending, then the partition is added to a list of valid partition(s) for which a current update operation(s) is still pending. By "current update operation" it is meant that the update operation is treated as pending as it is not fully processed and/or applied across the system.

In an example, the verifying, for each partition, that a current update operation on the partition is still pending may comprise searching, in the file storage, for each partition, for a control file that identifies the records of the partition that are object of a current update operation; the control file stores the name(s) of the file(s) of the valid partition(s) that are object of a current update operation. Here too, one single file name may be stored, which is not the usual situation.

In an example, the control file that stores the name(s) of the file(s) of the valid partition(s) that are object of a current update operation may be named with the partition name and a specific extension called PENDING_EXTENSION. The PENDING_EXTENSION control file aims at identifying the records of the partition that are object of a current update operation. The PENDING_EXTENSION file stores the name(s) of the file(s) of the partition that are object of the current update operation. The PENDING_EXTENSION file may be uploaded to the file storage at the time the update of the partition has started.

After the verification (for each partition whether or not a current update operation on the partition is still pending) has been achieved, a further control operation may comprise verifying if a past update operation on the partition has not been successfully achieved. "Past update operation on the partition has not been successfully achieved" means all the "pending" files that were used by a previous successful ALTER_REFRESH refresh but that failed to clean up the "pending" files from the stage; this is typically the case when an ALTER_REFRESH crashed before the end of the ALTER_REFRESH algorithm. If a past update operation on the partition has not been successfully achieved, then the control operation may further verify if a snapshot on which the unsuccessful update operation had been performed was registered in the catalog. The snapshot may be a past snapshot, or it may be the last snapshot.

If the snapshot is not recorded (or registered) in the catalog, this means that the previous alter refresh was unsuccessful as the new snapshot should have been registered in the catalog after that the catalog has identified, in an ACID transaction, the new snapshot as being the last snapshot on which the batch of tuples is to be applied. In consequence, the unsuccessful update operation is ignored and the "pending" files are not pending as the former ALTER_REFRESH has not been successfully achieved.

If the snapshot is recorded, this means that the former ALTER_REFRESH has been successfully achieved, but that the information that the past update operation on the partition has not been successfully achieved has been kept while it should have been deleted. Consequently, the partition can be removed from the list of the valid partition(s) for which an update operation(s) is pending.

In an example, the verifying if a past update operation on a partition has not been successfully achieved may comprise searching, in the file storage, for each partition, for a control file that identifies the records of the partition that were object of the past update operation; the control file may store the name(s) of the file(s) of the valid partition that were object of the past update operation. Here again, one single file name may be stored, which is not the usual situation.

In an example, the control file that stores the name(s) of the file(s) of the valid partition that were object of the past update operation may be named with the partition name and a specific extension called CONSUMED_EXTENSION. The CONSUMED_EXTENSION file may have been uploaded to the file storage at the start of the past update of the partition.

In an example, the verifying, for each partition named in the list of valid partition(s), if a past update operation on the partition has not been successfully achieved may comprises further control operations. These further control operations use two control files, i) the control files that store the name(s) of the file(s) of the valid partition(s) that are object of a current update operation; and ii) the control files that store the name(s) of the file(s) of the valid partition(s). A coherence is checked between these two files.

For the sake of clarity only, the coherence check is discussed in reference to the examples where the PENDING_EXTENSION files and the VALID_EXTEN-SION files are implemented. The control operations may comprise verifying that the content of the PENDING_EX-TENSION file is coherent with the content of the VALI-D_EXTENSION file. A VALID_EXTENSION file stores the name(s) of the file(s) of a partition that is valid, and a PENDING_EXTENSION file stores the name(s) of the file(s) of the partition that are object of the current update operation. For a valid partition, the name(s) listed in the VALID_EXTENSION file should not be found in the PENDING_EXTENSION file as the name(s) listed in the VALID_EXTENSION file should be made available for a subsequent access to the database, at the time the ALTER_REFRESH command has started its execution. If this is not the case, then the PENDING_EXTENSION file is ignored for the verifying. In other words, only the VALID_EXTEN-SION file is taken into account.

After having verified if a past update operation on the partition has not been successfully achieved, a further control operation of the ALTER_REFRESH command may create an empty "snapshot list" file and completes the "snapshot list" file by adding the name(s) of the file(s) of the valid partition(s) of the list of valid partitions for which a current update operation(s) is still pending, else the name(s) of the file(s) of the valid partition(s) of the list of the name(s) of the valid partition(s) if the list of valid partition(s) for which a former update operation(s) is still pending is empty. The obtained snapshot list thus names file(s) of the valid partition(s) to be made available for a subsequent access to the database, at the given time.

For the sake of clarity only, the completion of "snapshot list" file is now discussed in reference to the examples the PENDING_EXTENSION files and the VALID_EXTEN-SION files are implemented. After having verified if a past update operation on the partition has not been successfully achieved, the further control operation of the ALTER_RE-FRESH command may create an empty "snapshot list" file and completes the "snapshot list" file as follows. For each partition, if there is a file named in the PENDING_EXTEN-SION file, then the list of files names constituting this partition is given by the content of the PENDING_EXTEN-SION file and added in the "snapshot list" file. Else, the list of file names is given by the content of the VALID_EX-TENSION file and added in the "snapshot list" file. The "snapshot list" file naming file(s) of the last snapshot to be made available for a subsequent access to the database, at the given time, is now completed.

Then, a further control operation may comprise verifying that each file listed in the "snapshot list" is present in the stage. This may be performed by comparing the "snapshot list" with the list of the files in the stage of the last snapshot.

In an example, the uniquely identifying may comprise obtaining the last dataset snapshot identifier from the catalog and keeping in memory the last dataset snapshot identifier as a previous dataset snapshot. The registering the new snapshot in the catalog may further comprise verifying, by the catalog in an ACID transaction, that the last snapshot described in the catalog is the previous dataset snapshot (that have been kept in memory). The comparison between the two identifiers of the files is straightforward. If the last snapshot described in the catalog is the previous dataset snapshot; then the new snapshot is registered in the catalog as being the last snapshot on which the batch of tuples is applied. In the reverse situation, a concurrent ALTER REFRESH command is being executed and the new snap-shot file from the stage is removed.

In the examples, the ALTER_REFRESH command may further comprise control operations that provide a latch. As know per se, a latch is a synchronization mechanism used to control access to shared resources to ensure consistency and avoid conflicts in concurrent operations.

In the examples, the control operations may comprise latching the second read-only RDF graph database stored on the file storage. In this case, the latch is performed before obtaining in the stage the list of the files of the last snapshot. Once the new snapshot (recognized as the last snapshot) has been registered in the catalog, the new snapshot is unlatched.

In the examples, the latch may comprise using a control file whose presence on the file storage confirms that the second read-only RDF graph database have not be altered during the execution of the ALTER_REFRESH command. The control file may be uploaded to the file after the last snapshot has been uniquely identified. Then, the control operation may verify that, at each subsequent steps performed by the control operation, the control file is still present on the file storage. Finally, after the new snapshot has been registered in the catalog, the presence of the control file is controlled for the last time and the control file is removed from the file storage.

A further discussion regarding the latch is now provided. As the present disclosure relies on an RDF heterogeneous distributed storage made mainly of non-ACID compliant storage, as exemplified on FIG. 3, an algorithm may be needed that manages concurrent executions and that ensures that the execution of the algorithm is always correct. A latch is a synchronization mechanism used to control access to shared resources to ensure consistency and avoid conflicts in concurrent operations. In examples, the file storage may provide a similar mechanism, e.g., object locks in S3 docs.aws.amazon.com/AmazonS3/latest/userguide/object-lock-.html, but not all storage provide it. In example, the concurrency control operations may execute a latch algorithm; object lock does not depend on the underlying infrastructure capacities.

In examples, a dedicated START_EXTENSION control file may be used. The existence of this file will serve as a latch, as discussed in the different examples. If the process that created the START_EXTENSION file crashes before it removes this file from the stage, then this file should be removed to avoid deadlock. This is remedied by the following example of latching algorithm.

Add in the START_EXTENSION control file the ip address of the host (or any other mean to identify it) and the process id;

If a process encounters a START_EXTENSION file (called simply "start" file) when the process wants to create its own "start" file, read the ip address in the file:

If it is the one of another existing host within the cluster of the dataset, then a concurrent issue is indeed detected: the process cannot create its own "start" file;

Else if the ip address is the one of its own hosts, check the process id:

If it is not the same as its own, then a restart of the process happened: it is safe to replace the "start" file with a new one; // it may be mandatory for the deployment of the application to ensure one process per host. Otherwise, change this strategy may be changed accordingly.

Else, a concurrent issue is indeed detected;

Else, the ip address is unknown: the host that wrote the "start" file went down;

//It is safe to replace the "start" file with a new one.

There is still the case of a host that went down, and then came back up (also called a "split brain" in distributed systems, see medium.com/nerd-fortech/split-brain-in-distributed-systems-252b0d4d122e). To prevent this, all algorithms need to check that the "start" file is still their own before making any modifications to the stage. This operation will be summarized with the sentence "check the 'start' file is still its own" in the algorithms detailed;

If this check fails, a split brain occurred. Each algorithm then exits and need to clean-up the files it had already uploaded if any. If this cleanup is not done by the algorithm, it will be done by garbage collect (see dedicated section). Algorithm are designed to ensure atomicity of the operation (i.e., files uploaded in the stage are not taken into account if the algorithm failed before the end).

In an example, the control file is a file named with the last dataset snapshot name and a specific extension called START_EXTENSION. Thus, there is unique control file for each snapshot stored on the file storage.

Several examples of the ALTER_REFRESH command have been discussed. One or more of these examples may be combined. Is now discussed an example of the ALTER_RE-FRESH command under the form of a pseudo code algorithm. The terms used in this pseudo-algorithm are similar to those used in the examples the ALTER_REFRESH command. Interestingly, this pseudo code algorithm illustrates an example where the partitions are fragmented. It is to be understood that the fragmentation of the partition does not change the examples already discussed. This will be apparent in the following example. Comments start with //.

Input the ALTER REFRESH command: the dataset stored on the file storage

Get the last dataset snapshot of the dataset:

Get the last dataset snapshot identifier from the catalog;

Keep this information as the "previous dataset snapshot";

If the dataset snapshot is itself a file in the stage (catalog has only a redirection to it), then fetch it from the stage. Otherwise get all the information from the catalog;

Connect to the dataset snapshot using the cluster of the dataset;

//This means for example registering all the fragments as part of the dataset, and optionally pre-fetching the metadata files //Note that connections to dataset snapshots could be held in a cache and reused for later calls. This cache could then be cleared when "DISCONNECT" is executed and/or with any other cache replacement policy like LRU.

//Note that holding in a cache the dataset snapshots limits the usage of a garbage collect algorithm performed by a GARBAGE_COLLECT command; an example garbage collect algorithm is provided latter; any trade-off between caching and garbage collecting can be chosen without changing the disclosure.

Upload to the storage a latching control file named with the dataset name and a specific extension called START_EX-TENSION, for example ".start";

If this call succeeds, then the algorithm knows with certainty that no such file existed previously, and therefore no other "ALTER REFRESH" or "GARBAGE_C-OLLECT" is running concurrently for this dataset;

If this call fails, then a concurrent "alter refresh" or "garbage collect" is detected for this dataset: exit with this error;

Generate a new dataset snapshot name, for example dataset_snapshot_<uuid>", possibly with a dedicated extension, for example ".ttl" if the turtle format was chosen List all files in the stage

//This operation is done once and the whole list is copied in the memory of the process. We use this copy for the rest of the algorithm.

//The listing files operation is strongly consistent, as per the properties of the object storage.

Filter the files from this list of all files in the stage:

First, list all valid partitions by listing all files ending with the VALID_EXTENSION. The partition names are given by the name of VALID_EXTENSION the file without the extension;

For each partition name, filter it out of the list of valid partitions if there exists a file with the partition name followed by the extension TOMBSTONE_EXTENSION. //This gives us all the valid partition names.

For each valid partition name, check if there is a file starting with the partition name and ending with the extension PENDING_EXTENSION;

if yes, keep in memory the list of all PENDIND_EXTENSION files found here;//These files correspond to "ALTER_PARTITION" command that have not yet been taken into account, see dedicated algorithm discussed after;

For each file with the CONSUMED_EXTENSION extension//Note that these files exist only for ALTER_REFRESH command that crashed before the end of the algorithm; there should not be any in the nominal case:

Get the name of the dataset snapshot from the file name;

Check in the catalog that this dataset snapshot was registered:

If not: ignore this CONSUMED_EXTENSION file// it could be removed here or as garbage collect);

If yes:

Read the content of the CONSUMED_EXTENSION file// the CONSUMED_EXTENSION file gives all the "pending" files used by this dataset snapshot;

Check that the content of the PENDING_EXTENSION is coherent with the content of the VALID_EXTENSION file. If not, consider that the VALID_EXTENSION file was not updated with the content of the "dataset snapshot" in a previous extension and consider the content of the "dataset snapshot" as the content of the VALID_EXTENSION file;

Remove these files from the list of all PENDIND_EXTENSION files found in previous step //they were used by a previous successful alter refresh but that failed to clean up the "pending" files from the stage;

Create an empty list, called "snapshot list" file, that will list the names of the files of the dataset snapshot;

For each valid partition name, add the following files in the "snapshot list" file:

If there is a file in the list of files with the extension PENDING_EXTENSION, the list of files constituting this partition is given by the content of this file and added in the "snapshot list" file; else The list of files is given by the content of the file with the partition name and the VALID_EXTENSION extension and added in the "snapshot list" file;

Check that all files in the "snapshot list" exist in the listed files of the stage; //The list of files of the stage is the list copied in memory at the beginning of the algorithm; no actual check on the stage is done here

Check that for all fragments, there exists both the RDF file and the corresponding metadata file; //Note, there are potential delta files (whose existence is checked in the previous step that checked all files of the list); //Note that listing the files using the VALID_EXTENSION and PENDING_EXTENSION files give to the algorithm isolation against concurrent modification of the partitions;

Write the name of all the files of the "snapshot list" in the file of the new dataset snapshot // any format can be used for writing these names, e.g., it can be a done with a real semantic using RDF format in a turtle file, or simply a list if no more semantic is wanted.

Check the "start" file is still its own and upload the dataset snapshot file in the stage //Note that this dataset snapshot is not yet visible for subsequent transactions since it is not yet registered in the catalog, to preserve atomicity.

Check the "start" file is still its own and register the new dataset snapshot in the catalog as the last dataset snapshot, giving the kept information of the "previous dataset snapshot":

check in an ACID transaction by the catalog that the "last dataset" it knows is the "previous dataset" given as input to the check;

If yes, write two information:

register the last dataset snapshot in the catalog;

mark all the "pending" files as consumed:

write all the names for the files with the PENDING_EXTENSION extension in a file named with the dataset snapshot file name and a dedicated CONSUMED_EXTENSION, for example:

"<dataset_snapshot_name>.consumed";

Check the "start" file is still its own and upload the CONSUMED_EXTENSION file//Note that this CONSUMED_EXTENSION file was used at the beginning of the algorithm;

register this new last dataset snapshot in the catalog, linking it to the "previous dataset" to keep lineage//the lineage is optional;

//This call also checks that the "previous dataset" is correct, to avoid race conditions (or a lock could have been acquired by the catalog when it already checked it earlier);

//Registering it in the catalog means registering the dataset snapshot file name. Alternatively, all the information held in the file may be registered in the catalog, and not the file itself.

//Note that even if the process crashes after this, since "CONSUMED_EXTENSION" file has been created, a subsequent "ALTER_REFRESH" will not re-apply the pending operations, as seen at the beginning of the algorithm;

Replace the content of the VALID_EXTENSION file by the list of files comprised in the "dataset snapshot" for further alter refresh operation;

//Note that replacing the content of the file atomically can be done by creating a new file with the desired content than overwriting the existing file For all the PENDING_EXTENSION files, delete them from the stage;

Delete the file with the CONSUMED_EXTENSION extension;

If no:

the "last dataset" knows is not the "previous dataset" given as input to the check. /A concurrent "ALTER_REFRESH" command was executed.

Roll back the modifications made on the stage:

Remove the dataset snapshot file from the stage;

Remove the file with the CONSUMED_EXTEN-SION extension;

Return with an error: a concurrent "ALTER REFRESH" command was executed;

Check the "start" file is still its own and remove it;// For all the "exit" statements of this algorithm, and if any exception was raised by the previous steps, this file must be removed.

In examples, an ALTER PARTITION command may perform the sequences of concurrency control operations to be executed. The ALTER PARTITION command is performed after an ALTER REFRESH command that ensures the ACID properties of an update on the second RDF graph database of the virtual RDF graph database. The purpose of the ALTER PARTITION is to update a partition of the second read-only RDF graph database.

Examples of the ALTER PARTITION command are now discussed. These examples are set out with control files having a particular naming and extension schemes, being understood that the control files are not limited to these examples.

The control operations of the ALTER PARTITION command may comprise downloading, from the stage, the VALID_EXTENSION file of the valid partition to be updated. Hence, the name(s) of the file(s) of the valid partition are obtained. The valid VALID_EXTENSION file has been created at the time of the initial creation of the second read-only RDF graph database or updated further to successful update operations on the second read-only RDF graph database, or during an ALTER REFRESH command as already discussed herein above.

Then, the control operations of the ALTER PARTITION command may verify that no ALTER PARTITION command is executed simultaneously on the valid partition. If not, the ALTER PARTITION command is stopped, and the ALTER PARTITION command being already executed is retained.

Next, a PENDING_EXTENSION file may be created. The PENDING_EXTENSION file stores the name(s) of the file(s) of the valid partition that is(are) object of the current update operation. The name(s) of the file(s) is(are) obtained from the batch of tuples.

Once created, the PENDING_EXTENSION file may be uploaded to the stage, thus being accessible for further commands (if any).

Examples of the ALTER PARTITION command are now discussed where one or more batched partitions of the second read-only RDF graph database are split into fragments. All the batched partitions may be split. The control operations of the ALTER PARTITION command may further comprise determining if read-only second RDF dataset is a Change Data Capture, (CDC) file.

As known, CDC (acronym of Change Data Capture) to determine and track the data that has changed using delta files so that action can be taken using the changed data. A discussion of CDC can be reached here: en.wikipedia.org/wiki/Change_data_capture. Hence, CDC for SPARQL updates may be contemplated as a restriction of SPARQL 1.1 Update that enables to represent changes only as an extensional definition. FIG. 5 shows an example of how modifications of triples can be represented. It is possible to use any other representation without changing the disclosure. In example, the information of the modification of which triple(s) in which graph(s) may be provided.

If the batch of tuples is not a CDC file, fragments of the batch of tuples may be generated, thereby obtaining a list of fragment files. The generation of the fragments is discussed in reference to an ADD_PARTITION command.

If the batch of tuples is a CDC file, the following may be performed for each of the add/delete triple (of the batch of tuples) of the CDC file. Fragment of one of the one or more batched partition are located. The located fragment of the snapshot are those to which the add/delete operation will be applied. As a result of the location is obtained a list of fragments of the snapshot and an additional list of delta files if one or more delta file are associated with one or more of the fragments. Then, the control operations of the ALTER PARTITION command create a PENDING_EXTENSION file the list of fragments with an additional list of delta files (if any) are stored. The created (or obtained) PENDING_EXTENSION file is uploaded to the stage, thus being accessible for further commands (if any) as already discussed.

It is possible to alter a partition by using the ALTER PARTITION command. It is reminded that for the first RDF graph database (also referred to as dynamic partition), the modifications are made in streaming, therefore using simply SPARQL UPDATE queries.

For the read-only second RDF graph database, batch files are taken as input for updates, like for the creation of the partition. There are several choices for the input of the ALTER PARTITION command. A first way may be to give again the whole file that was used for the creation of the partition, but modified as desired (i.e., deprecated triples deleted, new triples added). That way, the fragments are regenerated (either as a whole or incrementally). In this solution, the input may be a file in a standard format like TriG. Another solution may be to give only the desired modifications (triples to delete, triples to add) as input. There are no standard format to formalize this, therefore we will define one. CDC may be used for that purpose, as discussed in reference to FIG. 5. The choice for one of the two solutions to use may be done by detecting the input file format (the batch of tuple). For example, for a full regeneration:

ALTER PARTITION [Name] INTO DATASET [dataset Name]{CONTENT=[file.trig.gz], DESCRIPTION="description" }

For an incremental input:

ALTER PARTITION [Name] INTO DATASET [dataset Name]{CONTENT=[file.cdc.gz], DESCRIPTION="description" }

Examples of the ALTER PARTITION command have been discussed. One or more of these examples may be combined. Is now discussed an example of the ALTER PARTITION command under the form of a pseudo code algorithm. The terms used in this pseudo-algorithm are similar to those used in the examples the ALTER PARTITION command. Interestingly, this pseudo code algorithm illustrates an example where the partitions are fragmented. It is to be understood that the fragmentation of the partition does not change the examples discussed. This will be apparent in the following example. Comments start with //.

Inputs of the ALTER PARTITION command:

An input RDF file comprising the batch of tuples to be added to and/or removed; //The input RDF file can be a standard RDF file like TriG, or a CDC file;

The last snapshot of the read-only second RDF graph database to be modified;

The partition name.

Check if the input files exist;

Upload to the storage a START_EXTENSION control file for latch control, e.g., named with the partition name and the specific extension called START_EXTENSION If this call succeeds, then the algorithm knows with certainty that no such file existed previously, and therefore no other "add/remove/alter partition" is running concurrently for this partition name;

If this call fails, then a concurrent "add/remove/alter partition" is detected with this partition name: exit with this error;

Download from the stage a VALID_EXTENSION control file for validity control of the partition, e.g., named with the partition name and the specific extension called VALID_EXTENSION If no such file exists, then no partition exists with this name, exist with this error;

if yes, next step of the algorithm is performed;

Check in the stage if there exists a PENDING_EXTENSION control file, e.g., named with the partition name and a specific extension called PENDING_EXTENSION, for example ".pending"

If yes, then there is already a pending alter partition operation for this partition; exit with this error;

If no, next step of the algorithm is performed;

Check in the stage if there exists a TOMBSTONE_EXTENSION control File e.g., named with the partition name and a specific extension called TOMBSTONE_EXTENSION If yes, then this partition has already been removed; exit with this error;

If no, next step of the algorithm is performed;

Verify if the input file is a CDC file;

If the input file is not a CDC file:

Generate the fragments for the input RDF file. An example of the generation is discussed the "ADD PARTITION" command obtain a a list of fragment files of the input RDF file;

If the input file is a CDC file:

For each add/delete triple of the CDC file:

Locate the fragment file of the last snapshot, to which the add/delete operations must be applied;

//Either generate a new version of the fragment file of the last snapshot (e.g., if the file could be modified in-place), or add one delta file with the same name but a specific extension (for example ".delta").

//The delta file may be either textual, and in that case, it is the same as the input CDC, or it may be a binary file—binary file avoids parsing textual files-.

// The delta file may be for example one HDT files for all the triples to add and one HDT file for all the triples to delete, but other strategies may be used without changing the disclosure. What is needed is one delta file to read in addition to the existing file to be able to answer to the BGP of a SPARQL query;

obtain a list of fragments with an additional list of delta files;

Create a new PENDING_EXTENSION control file named, e.g., with the partition name and the specific extension called PENDING_EXTENSION;

Add in this new PENDING_EXTENSION control file the list of fragments with potentially additional delta files from the previous step;

// all the files constituting the partition as thus given, not only the delta of modifications;

Check the "start" file is still its own and upload this file in the stage;

Check the "start" file is still its own and remove it from the storage. //For all the "exit" statements of this ALTER PARTITION command algorithm, and if any exception was raised by the previous steps, this file must be removed.

In examples, an ADD PARTITION command may perform the sequences of concurrency control operations to be executed. The ADD PARTITION command may be performed before an ALTER REFRESH command, the ALTER REFRESH command ensuring the ACID properties of an update on the second RDF graph database of the virtual RDF graph database. The purpose of the ADD PARTITION is to add a partition on the second read-only RDF graph database. For example, a typical sequence of commands may be the creation of the database, the execution of an ADD PARTITION command, and then the EXECUTION of an ALTER REFRESH command that makes the new partition visible for further processing (e.g., a SPARQL query).

It is to be understood that a new partition may be added in a given dataset. How it is done differs if it is a dynamic or a batched partition. A short discussion for the adding of a new partition on the first RDF Graph database is provided.

A dynamic RDF graph database may be created by default when a virtual RDF graph database is created. The created first RDF graph database is the one that will be modified by SPARQL UPDATE queries. The default partition has no name. A name and a description may be given to the partition, specifying that it is a dynamic partition, for instance by using the following command:

ADD PARTITION [Partition Name] INTO DATASET [dataset Name]{CONTENT='DYNAMIC', DESCRIPTION="description" }

Having a default dynamic partition is a choice made to ease the usage: this avoids having queries that are not aware of datasets based on external location. It may be possible to force the naming of all the partitions.

A short discussion for the adding of a new partition on the read-only second RDF Graph database is now provided.

For a batched partition, the input of the creation is a batch of tuples. The data source of this batch may be an RDF file (e.g., in TriG or HDT (discussed below) or any other format, additionally compressed with e.g., gzip or not), or a memory format like for example a dynamic partition (more on that later). The input batch may be then be split into one or more fragments. There may be several fragments if the input batch is too big: indeed, big files could be costly to fetch across the network, fetch from the object storage (cost per GB retrieved), and to navigate to answer the BGP; BGP is discussed below. Experimentations have shown that a maximum size of 10 million triples per fragment RDF file may be a good compromise. Once the input batch has been split into one or more RDF files, metadata of the fragments may be generated. Note that the choice of the final format for the RDF file of the fragment is independent from the format of the input format. The format chosen may be the one that best optimizes the usage—for example, choose a binary format instead of a human-readable format to lower the size-. When all this is done, the fragments (that is, the RDF files and their metadata) are uploaded into the stage associated with snapshot of the read-only RDF graph database. The data of the RDF files and their metadata (the fragments) will only be visible after a successful ALTER REFRESH command has been performed. The partition may be named; in this case, the name must be unique and can be an IRI or a literal value. An optional description may be added. The command may be for instance:

ADD PARTITION [Partition Name] INTO DATASET [dataset Name]{CONTENT=[file.ttl.gz], DESCRIPTION="description" }

An example of the ADD PARTITION command is now discussed. This example is set out with control files having a particular naming and extension schemes, being understood that these examples are not limited to these examples control files. The control operations of the ADD PARTITION command may comprise uploading, to the storage, a VALID_EXTENSION control file of the partition to be added. The presence of the uploaded VALID_EXTENSION on the storage indicates that no partition with a same name already exists of the file storage.

Then, the control operations of the ADD PARTITION command may generate fragments of the batch of tuples for the addition of the partition on the second read-only RDF graph database. The generation may be performed as discussed in the examples of the ALTER PARTITION command. Then a list of fragment files is obtained.

Next, the control operations of the ADD PARTITION command may store the list of fragments in the VALID_EX-TENSION control file and upload the VALID_EXTEN-SION control file to the stage. It is to be understood that the VALID_EXTENSION control file may be used for subsequent commands, e.g., and ALTER REFRSH command, an ALTER PARTITION command . . . .

Is now discussed an example of the ADD PARTITION command under the form of a pseudo code algorithm. The terms used in this pseudo-algorithm are similar to those used in the example of the ALTER PARTITION command. Comments of the pseudo code start with //.

Inputs of the ADD PARTITION command:

An input RDF file comprising the batch of tuples of the partition to the added; //The input RDF file can be a standard RDF file like TriG, or a CDC file;

The dataset, e.g., the last snapshot of the read-only second RDF graph database to be modified by adding a partition;

The name of the partition to be added;

A reserved character as delimiter, for example "_", called DELIMITER

Initiation of the ADD PARTITION command

Check if the input RDF file name exists;

Check the partition name does not already have the DELIMITER character;

Upload to the storage a START_EXTENSION control file for latch control, e.g., named with the partition name and a specific extension called START_EXTENSION, for example ".start", called the "start" file;

If this call succeeds, then the algorithm knows with certainty that no such file existed previously, and therefore no other "add/remove/alter partition" is running concurrently for this partition name;

If this call fails, then a concurrent "add/remove/alter partition" is detected with this partition name: exit with this error;

Upload to the stage a VALID_EXTENSION control file for validity control of the partition, e.g., named with the partition name and a specific extension called VALID_EXTEN-SION, for example ".valid"

Check the "start" file is still before uploading

If this call succeeds, then the algorithm knows with certainty that no such file existed previously, and therefore no partition exists with this name;

If this call fails, then a partition with the input partition name already exists: exit with this error, saying that "alter partition" should be done instead Generate the fragments for the input RDF file:

Parse (or read if it is binary) the input RDF file and split it into smaller files. The smaller files may have a maximum number of triples of SPLIT_SLICE (for example 10 million triples), potentially preserving Skolemization of blank nodes (Skolemization is discussed later); //each smaller file will be a part of a respective fragment, where a fragment comprises a smaller file and associated metadata For each of these smaller files, generate an RDF file in the chosen format. This format may be chosen to optimize a use case, for example a binary RDF format like HDT;

Generate the metadata file of the smaller files, if this option was chosen; //The fragment is identified by the pair: RDF file of the small file and metadata file;

Check the "start" file is still its own and upload all the fragments to the stage:

The partition name may be set in the fragment name for integrity checks, for example all fragments can be named as follows: "fragment_<uuid>_<partitionName>.<extension>" where "<uuid>" is a generated unique identifier, <partitionName> is the input partition name, <extension> is the extension of the file (it is different for the RDF file—for example ".hdt" of ".trig.gz"- and for the metadata file, for example ".metadata");

If one of the uploads fails:

exit with error;

uploaded files will not be visible. They may be removed here, or in a later garbage collect pass;

Create a new VALID_EXTENSION control file called "a validity file", e.g., named with the partition name and the specific extension called VALID_EXTENSION;

Write the list of all the fragment files in this "validity file";

Check the "start" file is still its own and upload the "validity file" to the stage; //all the fragment files uploaded before this "validity file" will not be taken into account by an "ALTER REFRESH" command. Therefore, this "validity file" ensure the atomicity of the "ADD PARTITION" command.

Check the "start" file is still its own and remove it

//For all the "return" statements of this ADD PARTITION algorithm, and if any exception was raised by the previous steps, the START_EXTENSION control file must be removed.

Still in reference to the ADD partition command, the partitioning is now discussed. Multiple strategies exist for partitioning. The partitioning is provided to the command, which means the command is not involved in the partitioning. The present disclosure is independent of the strategy used for creating the partitioning.

It might be also possible to have overlapping partitions (i.e., a triple being duplicated in more than one partition). In that case, the management of the overlap would be done both at write queries (e.g., the triple must be deleted from all the partitions that have it) and at read queries (e.g., be aware of potential duplicate in a query result). Having overlapping partitions or not is left as a choice of the software responsible for determining the partitions.

In examples, a REMOVE PARTITION command may perform the sequences of concurrency control operations to be executed. The REMOVE PARTITION command may performed before an ALTER REFRESH command that ensures the ACID properties of the removal on the second RDF graph database of the virtual RDF graph database. The purpose of the REMOVE PARTITION is to remove a partition on the second read-only RDF graph database. For example, a typical sequence of commands may be the creation of the database, the execution of an REMOVE PARTITION command, and then the EXECUTION of an ALTER REFRESH command that renders invisible the deleted partition for further processing (e.g., a SPARQL query).

Removing a partition is straightforward: it makes invisible all data related to it, being understood that a past transaction may continue to see the data. This means all the data for a batched partition, or the fragments for a fragmented batched partition, or the memory data structures for a dynamic partition. The command may be:

REMOVE PARTITION [NAME] FROM DATASET [Dataset Name]

This change will only be visible after a successful GARBAGE_COLLECT command as the remove partition command does not remove the files from the storage. Examples of the GARBAGE_COLLECT command will be discussed later.

In examples, the control operations of the REMOVE PARTITION command may comprise verifying, on the stage, if the partition to be removed exists, and if not, stopping the REMOVE PARTITION command.

Next, the control operations of the REMOVE PARTITION command may upload to the stage a TOMBSTONE_EXTENSION control file. The TOMBSTONE_EXTENSION control file aims at identifying the records of the partition that are object of a current delete operation. A successful uploading confirms that the partition to be removed of the second read-only RDF graph database exists, that is, no record of the partition has already been deleted. The TOMBSTONE_EXTENSION control file may store all the records of the partition to be deleted as all these records should be deleted. The TOMBSTONE_EXTENSION control file being now uploaded in the stage; the partition is recorded as deleted.

Is now discussed an example of the DELETE PARTITION command under the form of a pseudo code algorithm. The terms used in this pseudo-algorithm are similar to those in the example of the ALTER PARTITION command. Comments of the pseudo code start with //.

Inputs of the DELETE PARTITION command:

The dataset, e.g., the last snapshot of the read-only second RDF graph database to be modified by deleting a partition;

The name of the partition to be deleted;

Upload to the storage a START_EXTENSION control file for latch control, e.g., named with the partition name and a specific extension called START_EXTENSION, for example ".start", called the "start" file;

If this call succeeds, then the algorithm knows with certainty that no such file existed previously, and therefore no other "add/remove/alter partition" is running concurrently for this partition name;

If this call fails, then a concurrent "add/remove/alter partition" is detected with this partition name: exit with this error;

Check in the stage a VALID_EXTENSION control file for validity control of the partition, e.g., named with the partition name and a specific extension called VALID_EXTENSION, for example ".valid":

If no, then no partition exists with this name: exit with this error;

if yes, next step of the algorithm is performed;

Upload to the storage a TOMBSTONE_EXTENSION control file, e.g., named with the partition name and a specific extension called TOMBSTONE_EXTENSION, for example ".removed"; This upload is performed if it has been checked that the "start" file is still its own;

If this call succeeds, then the algorithm knows with certainty that no such file existed previously, and therefore this partition was not yet removed;

If this call fails, then a partition with the input partition name was already removed: exit with this error;

Check the "start" file is still its own and remove it;

//For all the "return" statements of this ADD PARTITION algorithm, and if any exception was raised by the previous steps, the START_EXTENSION control file must be removed.

In the examples, to preserve blank nodes identification, the input RDF file may skolemize the blank nodes to identify them as uniquely defined by their identifier. This is discussed in Tomaszuk, D. and Hyland-Wood, D., 2020. RDF 1.1: *Knowledge representation and data integration language for the Web.* Symmetry, 12(1), p. 84. The ADD/REMOVE/ALTER PARTITION commands can have an "SKOLEMIZED" option to warn them to keep the identification of the blank nodes.

In the examples, the dataset snapshot of the second RDF graph database may be hold in a cache. Additionally or alternatively, old dataset snapshots and the corresponding unused fragments or partitions may be removed from the distributed storage when all transactions using them are ended. In these examples, a GARBAGE_COLLECT command may be used for removing the unused data of the stage. As an example, used data may be:

data records;

fragments, i.e data files: RDF files (e.g., «trig.gz», «.hdt», etc; depending on the choice made), the corresponding metadata (e.g., ".metadata" if this option was chosen), the delta files (e.g., ".delta");

control files indicating existing partitions, e.g., the VALID_EXTENSION control file and the TOMBSTONE_EXTENSION control file;

control files indicating modifications on the partitions, e.g., the PENDING_EXTENSION control file and the CONSUMED_EXTENSION control file.

An example of GARBAGE_COLLECT command algorithm is now discussed. Comments start with //.

Inputs of the GARBAGE_COLLECT command:

The dataset, e.g., the last snapshot of the read-only second RDF graph database;

Upload to the storage a START_EXTENSION control file, e.g., named with the dataset name and a specific extension called START_EXTENSION, for example ".start";

If this call succeeds, then the algorithm knows with certainty that no such file existed previously, and therefore no other "ALTER REFRESH" or "GARBAGE COLLECT" commands is running concurrently for this dataset;

If this call fails, then a concurrent "alter refresh" or "garbage collect" is detected for this dataset: exit with this error List all the dataset snapshots from the catalog and get the "last dataset snapshot"; //All dataset snapshots except the "last dataset snapshot" are candidates for removal Ask the cluster of the dataset to obtain all the dataset snapshots currently used by a connection. Remove these from the list of candidates of "dataset snapshot to remove"; //this request on the catalog can be done in several ways. For example, the catalog may be notified every time a connection is created on a given dataset snapshot, and every time such a connection is closed. //Note that this is impacted by the caching of connections;

Remove all the "dataset snapshot to remove" from the catalog;

No new connection to the dataset will be able to start with these "dataset snapshot to remove"; // this does not affect the existing connections to the dataset using these "dataset snapshot to remove";

For all dataset snapshots candidates to removal:
  Remove the dataset snapshot files from the stage;
  Remove from the stage all CONSUMED_EXTENSION files starting with these dataset snapshot names;
List the dataset snapshots that are not candidates to removal, thereby obtaining a "list of alive dataset snapshots";

List all files in the stage; //This operation is done once and the whole list is copied in the memory of the process. The algorithm uses this copy for the rest of the algorithm. The listing files operation is strongly consistent, as per the consistent write properties of the object storage For all the files in this list, take all the files ending with the TOMBSTONE_EXTENSION extension. //The corresponding partition name is given by the name of the file without the extension. These are the removed partition names.

If there exists a file with the same partition name and a VALID_EXTENSION extension, and optionally a file with the same partition name and a PENDING_EXTENSION extension:
    read the content of this/these file(s), it gives us a list of files to delete from the stage called "to-delete list";
    Execute the cleanup operation:
      Check the start file is still its own and delete the VALID_EXTENSION file from the stage (if there was one);
      Delete the PENDING_EXTENSION file from stage;
      Delete all the files of the "to-delete list" from stage; //This will delete the data files: RDF files, metadata files, delta file;
      Delete the TOMBSTONE_EXTENSION file from stage;
Check for files to delete even if some inconsistencies are found:
  TOMBSTONE_EXTENSION file without a corresponding VALID_EXTENSION or PENDING_EXTENSION file: remove them from stage;
  CONSUMED_EXTENSION files without a corresponding dataset snapshot file: remove them from stage;
  PENDING_EXTENSION file without a VALID_EXTENSION or TOMBSTONE_EXTENSION file:
    List all the files given by the content of the PENDING_EXTENSION file and delete them from stage if they exist;
    Delete the PENDING_EXTENSION file from stage;
    If there exists a file with the same partition name and the TOMBSTONE_EXTENSION extension, delete if from stage;
Perform an optional "full pass"; //"full pass" is a more thorough cleanup pass: //on a previous step, the algorithm got the list of alive dataset snapshots:
  Create an empty list called "the list of used data files": // a "list of alive dataset snapshots" stores the dataset snapshots that are not candidates to removal, the alive dataset snapshots;

For each of these alive dataset snapshot files:
  Read the content of the alive dataset snapshot file and obtain the list of data files for the dataset snapshot // RDF file, metadata file (if any), delta file (if any));
  Add this list to "the list of used data files"
Create an empty list called "the list of garbage files";
Read the list of all files of the stage that was created at the beginning of the GARBAGE_COLLECT command algorithm. For each of the data files (i.e., RDF file, metadata file, delta file) in it:
  If the file is not also in "the list of used data files", add it to "the list of garbage files";
  Remove all the files in "the list of garbage files" from the stage;
Check the "start" file is still its own and remove it;
//For all the "exit" statements of this algorithm, and if any exception was raised by the previous steps, this file must be removed.

In examples, a CREATE DATASET command may be used for creating a new dataset. The command takes as input the location of the stage of the dataset to be created. Here is an example of a potential command to create a dataset:

CREATE DATASET <Name>{
      STAGE=<stage_name>
    }

As a result of the execution of the CREATE DATASET command, the catalog registers the association between the logical name of the dataset and the location of the files that are modeled by the stage.

In examples, a CREATE STAGE command may be performed for creating a new stage. As already defined, a stage of a dataset models a location where the files constituting the dataset are stored. For example, a "stage" is defined here: docs.snowflake.com/en/sql-reference/sql/create-stage. It is to be understood that the purpose of the disclosure is not to describe a location inside a distributed object storage. In other words, the disclosure may rely on any known method for describing such a location. In examples, the files may be stored outside of the database, e.g., inside an external cloud storage. The storage location may be either private or public. In examples, to avoid duplicating information for each stage, a storage integration may be used to delegate authentication responsibility. The document docs.snowflake.com/en/sql-reference/sql/create-storage-integration describes an example of storage integration, being understood that any known method for storage integration may be used with the present disclosure. A single storage integration may support multiple external stages.

All these information (location of the files, internal or external storage, authentications . . . ) are (stored in) metadata describing the dataset. These metadata are stored directly in the catalog, the metadata being similar to key/value pairs. Only the general information are given when the storage integration is created; this information is specific to the cloud storage service. In examples, the following CREATE STORAGE INTEGRATION command may be used for creating a dataset:

```
CREATE STORAGE INTEGRATION <name> {
  TYPE = EXTERNAL_STAGE ,
  STORAGE_PROVIDER = '...' ,
  URL = 'storage_url' ,
  CREDENTIALS_KEY_ID = 'keyid' ,
  CREDENTIALS_KEY_VALUE = 'keyvalue'
}
``` and for the creation of a stage using this storage integration the following

```
CREATE STAGE <external_stage_name> {
    STORAGE_INTEGRATION = <storage_integration_name> ,
    TENANT = 'tenant' ,
    CLUSTER_ID = 'clusterid' ,
    BUCKET = 'bucket' ,
    PATH = '/<path>/'
}
```

It is now discussed the concept of cluster. Cluster concept has been introduced in the pseudo code algorithm of the ALTER_REFRESH command. In this example, the algorithm may connect to the dataset snapshot using the cluster of the database. The dataset that the command wants to access represents a heterogeneous storage. Access to the physical resources may be needed to be able to present this dataset to the SPARQL compute layer in a way that the SPARQL compute layer can use it. Therefore, linking the dataset to a cluster representing the physical resources available for the dataset may be needed. As known, a cluster is a group of computing resources called nodes.

The computing resources may be allocated either statically or dynamically, where statically means all the resources are available when the cluster starts; and dynamically means the resources automatically increase or decrease the available resources, depending on the workload. The computing resources may be either embedded in the memory of the parent process or as stand-alone processes.

The computing resources may be used to answer the requirements of the SPARQL compute layer. Answering the SPARQL query engine requirements means answering the eight triple patterns (S,P,O), (S,?P,O), (S,P,?O), (S,?P,?O), (?S,P,O), (?S,?P,O), (?S,P,?O), and (?S,?P,?O); with the addition of the graph that may be variable, then they are basic graph pattern (BGP). Therefore, the resources of a cluster may be used to answer to these BGP for each partition.

How the partition answers to these BGP is not specific to the present disclosure, and many solutions might be chosen with various trade-off. The virtual RDF graph database has both dynamic and batched partitions. Dynamic partitions may be implemented by any RDF database, e.g., Blazegraph that is set out here github.com/blazegraph/database, for example an embedded in-memory RDF database. Batched partitions may comprise a set of fragments, where each fragment is an RDF file along with a metadata file. The RDF file may be in human-readable format such as TriG (www.w3.org/TR/trig/) or in binary format such as HDT; HDT is described in Fernández, J. D., Martínez-Prieto, M. A., Gutiérrez, C., Polleres, A. and Arias, M., 2013. *Binary RDF representation for publication and exchange (HDT)*. Journal of Web Semantics, 19, pp. 22-41. The metadata comprise, but are not limited to, information that help evict easily and rapidly if an RDF file should be used to answer a triple pattern, such as which graphs, predicates and/or datatypes are used. Thus, a batched partition answers to the BGP by first asking the metadata if the file may be useful, and if yes, accesses the file to answer the BGP. For this, the file may require an in memory database to answer (like for TriG) or not (like HDT). The format of the file may vary without changing the present disclosure.

It is now discussed the connection to a dataset. Once a dataset has been created by the CREATE DATASET command, it is possible to connect to the dataset by specifying a cluster, that is, to a group of computing resources called nodes. For example, the following CONNECT TO DATASET command may be used:

CONNECT TO DATASET <dataset_name>USING CLUSTER 'EMBEDDED'

A process may have several connections to different datasets. A cluster may be used for several datasets.

In the example of CONNECT TO DATASET command, an embedded cluster may be used. It may be possible to define a cluster of different nodes; in that case the definition is dependent of the architecture and cloud provider used. In such a case, the name of the cluster may be provided instead of the 'EMBEDDED' keyword above.

After the CONNECT TO DATASET command, the SPARQL query engine is able to use the dataset to answer its queries, e.g., the cluster may then download locally the metadata of the fragments locally to be able to evict fragments rapidly without accessing the external storage. Experiments have shown that the metadata are about 2% to 5% of the total size of the RDF files and thus are good candidates for pre-fetching from the external storage.

It may be possible to disconnect from a dataset using for example the following DISCONNECT FROM DATASET command:

DISCONNECT FROM DATASET <dataset_name>

It is now discussed the possibility to describe a stage, an external storage or a dataset by using a variant of the DESCRIBE command discussed here www.w3.org/TR/sparql11-query/#describe. For example, the DESCRIBE commands may be:

DESCRIBE STORAGE INTEGRATION <Name>

DESCRIBE STAGE <Name>

DESCRIBE DATASET <Name> will list the parameters given at the CREATE command with potential restrictions, e.g., credentials given at the creation of the storage command can be omitted for confidentiality reason. For a dataset, it may also list all the files of the "last dataset snapshot" fetched from the catalog.

It is now discussed the possibility to drop a stage, an external storage or a dataset by using a variant of the DROP command discussed here www.w3.org/TR/sparql11-update/#drop. For example, the DROP commands maybe:

DROP STORAGE INTEGRATION <Name>

DROP STAGE <Name>

DROP DATASET <Name>

In an example, the DROP DATASET command may be performed using the following algorithm. One understands that this algorithm does not remove files from the stage. A "DROP STAGE" operation is needed to do it.

Input: the dataset

Remove from the catalog all the information needed to create a connection on the dataset;

//Therefore no new connection can be created

Remove from the catalog the last dataset definition information; // Therefore no new transaction can be created.

In an example, the DROP STAGE command may be performed using the following algorithm.

Input: the stage

Ensure from the catalog that the stage exists and that no datasets are using it

Otherwise, return with this failure;

Execute a "full" garbage collection operation;

If currently running transactions are detected (i.e., the "live dataset snapshots" in the algorithm of the GARBAGE_COLLECT command, then return with this error; /the drop stage could not finish properly and will need to be re-run;

Otherwise, delete all stage information from the catalog.

In an example, the DROP STORAGE INTEGRATION command may be performed using the following algorithm.
Input: the storage integration
Ensure from the catalog that the storage integration exists and that no stages are using it;

Otherwise, return with this failure;
Remove from the catalog all information regarding the storage integration.

It has been discussed computing resources may be used to answer the requirements of the SPARQL compute layer. Answering the SPARQL query engine requirements means answering the eight triple patterns (S,P,O), (S,?P,O), (S,P,?O), (S,?P,?O), (?S,P,O), (?S,?P,O), (?S,P,?O), and (?S,?P,?O); with the addition of the graph that may be variable, then they are basic graph pattern (BGP). It has been also discussed that the virtual RDF graph database comprises both dynamic and batched partitions; dynamic partitions may be implemented by any RDF database and batched partitions may comprise a set of fragments, where each fragment is an RDF file along with a metadata file. A batched partition answers to the BGP by first asking the metadata if the file may be useful, and if yes, accesses the file to answer the BGP.

Hence, answering a SPARQL query for a storage means answering the basic graph patterns (BGP). A "composite transaction" means a transaction that uses both storages (i.e., using dynamic and batched partitions) and therefore which executes all transaction operations (begin/commit/abort/end) on both storages.

As seen in previous discussions, ACID properties are verified by both the storage receiving streaming modifications and the storage receiving batch modifications. When a composite transaction is started that requires both storages, a dataset snapshot is fetched (for example the last dataset snapshot) and a connection is made to it. This dataset snapshot will be used for all the queries of the transaction. The opening of the connection may prevent the GARBAGE COLLECT command to delete the files linked from this dataset definition. From the previous examples, concurrent algorithms on ADD PARTITION, REMOVE PARTITION commands, or ALTER REFRESH, GARBAGE COLLECT commands will not impact the batched partitions used by this dataset definition, therefore insuring isolation. As per the "standard" ACID properties of the dynamic partitions, this is also true for dynamic partitions. Therefore, isolation is ensured for the composite transaction. Similarly, atomicity, consistency and durability are also ensured. Therefore, composite transactions are indeed ACID transactions.

In reference to FIG. 2, it is proposed a computer-implemented method of executing, with isolation guaranty, a triple pattern of a SPARQL query on the virtual RDF graph database. It is reminded that the triple pattern of the SPARQL query may encompasses at least one the eight triple patterns (S,P,O), (S,?P,O), (S,P,?O), (S,?P,?O), (?S,P, O), (?S,?P,O), (?S,P,?O), and (?S,?P,?O). The method comprises obtaining S200 a last registered snapshot of a virtual RDF graph database described in the catalog. Here the term snapshot encompasses the first and second RDF graph database. As the first virtual RDF graph database is updatable by streams of tuples, the state of the dataset snapshot is obtained for a given time, e.g., the time at which the SPARQL query is to be executed. This implies that the modifications of the first RDF graph database after the given snapshot will not be taken into account for answering the SPARQL query. For each triple pattern obtained S210, the triple pattern is executed on the first RDF graph database of the virtual RDF graph database. As already discussed, this is performed as known in the art. Next, or concomitantly, the triple pattern is executed on the last snapshot of the second RDF graph database of the virtual RDF graph database registered in the catalog. As discussed, the last snapshot batched partition answers to the BGP by first asking the metadata referenced in the catalog if the file may be useful, and if yes, accesses the file to answer the BGP. In examples, the batched partitions of the second RDF graph database may be fragmented. In this example, each fragment is accompanied by metadata describing the fragments, and possibly a delta file storing updates on the fragment. The metadata and the delta files are queried for obtaining the answer to the query. For instance, for each triple pattern of the query, the tuples answering to the triple pattern of the query may be found into the last snapshot, thereby obtaining a first set of results, and for each triple pattern of the query, it is determined in the delta files if tuples answering the triple pattern are to be deleted and/or added, and if tuples are to be deleted, the tuples are removed from the first set of results, and if tuples are to be added, the tuples are added to the first set of results.

The methods are computer-implemented. This means that steps (or substantially all the steps) of the methods are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 6:
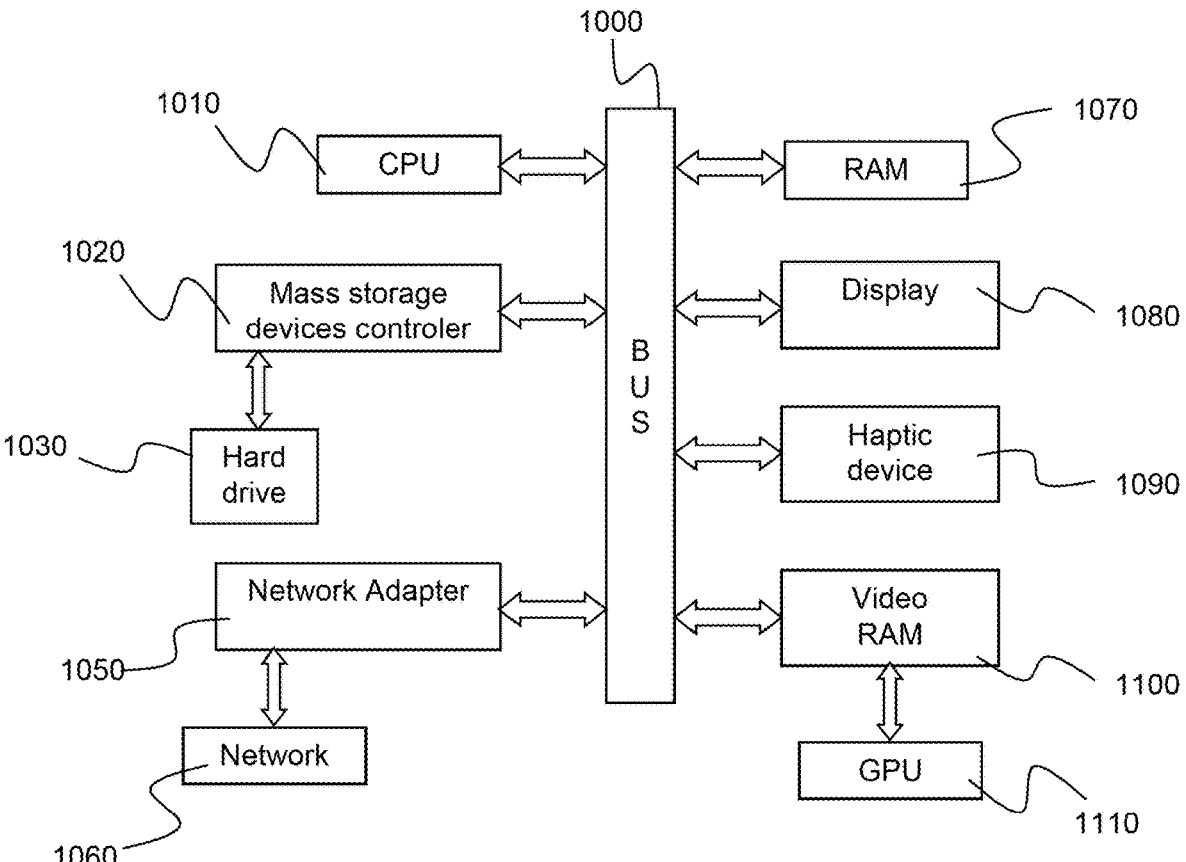
FIG. 6 shows an example of the system.

FIG. 6 shows an example of the system, wherein the system is a client computer system, e.g., a workstation of a user.

The client computer of the example comprises a central processing unit (CPU) 1010 connected to an internal communication BUS 1000, a random-access memory (RAM) 1070 also connected to the BUS. The client computer may be further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. The steps of the methods may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

The invention claimed is:

1. A computer-implemented method for updating a virtual RDF graph database including at least two RDF graph databases seen as one logically equivalent RDF graph database, the virtual RDF graph database comprising tuples, the method comprising:

obtaining a file storage having a durability D property of ACID property, the file storage being distributed or not, the file storage guarantying consistent write;

obtaining a virtual RDF graph database, the virtual RDF graph database including:

a first RDF graph database stored on an in-memory data structure and updatable by streams of tuples to be added to and/or removed from the first RDF graph database, and a second read-only RDF graph database stored on the file storage and updatable by batches of tuples to be added to and/or removed from the second RDF graph database, thereby forming a snapshot that is a read-only and updatable;

obtaining a catalog for storing metadata describing the second read-only RDF graph database on the file storage, the catalog being compliant with ACID;

obtaining a stream of tuples to be added to and/or removed from the virtual RDF graph database and obtaining a batch of tuples to be added to and/or removed from the virtual RDF graph database;

applying the stream of tuples on the first RDF graph database of the virtual RDF graph database; and applying the batch of tuples on the second RDF graph database of the virtual RDF graph database by:

computing a snapshot of the second RDF graph database, including the batch of tuples, the computing guarantying ACID property of the snapshot by sequences of concurrency control operations duly executed using consistent write of the file storage;

storing, on the file storage, the computed snapshot; and registering the computed snapshot in the catalog, thereby obtaining an updated description of the virtual RDF graph database.

2. The computer-implemented method of claim 1, wherein an ALTER REFRESH command performs the sequences of concurrency control operations duly executed, the ALTER REFRESH command ensuring the ACID properties of an update on the second RDF graph database of the virtual RDF graph database, the ALTER REFRESH's sequences of concurrency control operations including:

uniquely identifying a last snapshot of the second RDF graph database, the last snapshot representing a state of the snapshot formed by the second RDF graph database at a given time;

verifying that no other ALTER REFRESH command is executed simultaneously, else stopping the ALTER REFRESH command and retaining the ALTER REFRESH command being already executed;

obtaining a list of the files in a stage of all snapshot(s), including the last snapshot;

filtering the files of the list of the files in the stage of the last snapshot, thereby obtaining a snapshot list naming files of the last snapshot to be made available for a subsequent access to the database, at the given time;

writing the names of the files of the snapshot list, thereby obtaining a new snapshot that is unregistered in the catalog;

uploading to the stage a file of the new snapshot; and registering the new snapshot in the catalog after the catalog has identified, in an ACID transaction, the new snapshot as being the last snapshot on which the batch of tuples is to be applied.

3. The computer-implemented method of claim 2, wherein obtaining the snapshot list naming files of the last snapshot to be made available for a subsequent access to the database, at the given time, further comprises:

obtaining a list of the name(s) of valid partition(s);

for each partition named in the list of valid partition(s):

verifying if a current update operation on the partition is still pending, and if yes, adding the partition to a list of valid partition(s) for which a current update operation(s) is still pending; and verifying if a past update operation on the partition has not been successfully achieved, and if yes, verifying, in the catalog, if a snapshot on which the unsuccessful update operation had been performed was registered in the catalog:

if not, ignoring the unsuccessful update operation; and if yes, removing the partition from the list of the valid partition(s) for which an update operation(s) is pending;

creating an empty snapshot list file, and completing the snapshot list file by adding:

the name(s) of the file(s) of the valid partition(s) of the list of valid partitions for which a current update operation(s) is still pending; else the name(s) of the file(s) of the valid partition(s) of the list of the name(s) of the valid partition(s) if the list of valid partition(s) for which a former update operation(s) is still pending is empty;

thereby obtaining the snapshot list naming file(s) of the last snapshot to be made available for a subsequent access to the database, at the given time; and verifying that each file listed in the snapshot list is present in the stage.

4. The computer-implemented method of claim 3, wherein:

the obtaining a list of the name(s) of valid partition(s) includes searching in the file storage, for each partition, for a file named with the partition name and a specific extension called VALID_EXTENSION, the VALID_EXTENSION file storing the name(s) of the file(s) of the partition, the VALID_EXTENSION file having been uploaded to the file storage at the time of a creation of the partition; and/or the obtaining a list of the name(s) of valid partition(s) includes searching, for each partition, in the file storage, for a file named with the partition name and a specific extension called TOMBSTONE_EXTENSION, the TOMBSTONE_EXTENSION file storing the name(s) of the file(s) of the partition that are object of a current delete operation, the TOMBSTONE_EXTENSION file having been uploaded to the file storage when performing a delete operation of the partition; and/or the verifying, for each partition named in the list of valid partition(s), if a current update operation on the partition is still pending, includes searching, in the file storage, for each partition, for a file named with the partition name and a specific extension called PENDING_EXTENSION, the PENDING_EXTENSION file storing the name(s) of the file(s) of the partition that are object of the current update operation, the PENDING_EXTENSION file having been uploaded to the file storage when performing the current update of the partition; and/or the verifying, for each partition named in the list of valid partition(s), if a past update operation on the partition has not been successfully achieved, includes searching in the file storage, for each partition, for a file named with the partition name and a specific extension called CONSUMED_EXTENSION, the CONSUMED_EXTENSION file storing the name(s) of the file(s) of the partition that were object of the past update operation, the CONSUMED_EXTENSION file having been uploaded to the file storage when performing the past update of the partition.

5. The computer-implemented method of claim 4, wherein the verifying, for each partition named in the list of valid partition(s), if a past update operation on the partition has not been successfully achieved further comprises: verifying that the content of the PENDING_EXTENSION file is coherent with the content of the VALID_EXTENSION file, and if not, considering that the list of the files of the last snapshot is the content of the VALID_EXTENSION file; and wherein the PENDING_EXTENSION file is ignored for the verifying, for each partition named in the list of valid partition(s), if a current update operation on the partition is still pending.

6. The computer-implemented method of claim 2, wherein:

uniquely identifying the last snapshot of the second RDF graph database comprises obtaining the last dataset snapshot identifier from the catalog and keeping in memory the last dataset snapshot identifier as a previous dataset snapshot;

and wherein registering the new snapshot in the catalog further comprises:

verifying, by the catalog in an ACID transaction, that the last snapshot described in the catalog is the previous dataset snapshot:

if yes, registering the new snapshot in the catalog as being the last snapshot on which the batch of tuples is applied;

if no, determining that a concurrent ALTER REFRESH command is executed and removing the new snapshot file from the stage.

7. The computer-implemented method of claim 4, wherein an ALTER PARTITION command performs further sequences of concurrency control operations for the update of a partition of the second read-only RDF graph database, the ALTER PARTITION command being performed before the ALTER REFRESH command, the ALTER PARTITION's sequences of concurrency control operations including:

downloading, from the stage, the VALID_EXTENSION file of the valid partition to be updated, thereby obtaining the name(s) of the file(s) of the valid partition;

verifying that no ALTER PARTITION command is executed simultaneously on the valid partition, else stopping the ALTER PARTITION command and retaining the ALTER PARTITION command being already executed;

creating a PENDING_EXTENSION file storing the name(s) of the file(s) of the valid partition that is object of the current update operation, the name(s) of the file(s) of the valid partition being object of the current update operation and being obtained from the batch of tuples; and uploading the PENDING_EXTENSION file to the stage.

8. The computer-implemented method of claim 7, wherein the snapshot of the second RDF graph database includes a set of batched partitions, one or more batched partitions being split into fragments, the creating the PENDING_EXTENSION file includes:

determining if the batch of tuples is a Change Data Capture, (CDC) file, and performing:

if the batch of tuples is not a CDC file, generating fragments of the batch of tuples, thereby obtaining a list of fragment files; else if the batch of tuples is a CDC file, for each for each add/delete triple of the CDC file, locating the fragment of one of the one or more batched partition to which to which the add/delete operation will be applied, thereby obtaining a list of fragments with an additional list of delta files, if any; and wherein the creating the PENDING_EXTENSION file includes creating the PENDING_EXTENSION storing the list of fragments with an additional list of delta files, if any.

9. The computer-implemented method of claim 4, wherein an ADD PARTITION command performs further sequences of concurrency control operations for an adding of a partition on the second read-only RDF graph database, the ADD PARTITION command being performed before the ALTER REFRESH command, the ADD PARTITION's sequences of concurrency control operations including:

uploading, to the storage, a VALID_EXTENSION file of the partition to be added, a successful uploading of the VALID_EXTENSION file indicating that no partition with a same name exists of the file storage;

generating fragments of the batch of tuples for the addition of the partition on the second read-only RDF graph database, thereby obtaining a list of fragment files; and storing the list of fragments in the VALID_EXTENSION file and uploading the VALID_EXTENSION to the stage.

10. The computer-implemented method of claim 4, wherein a REMOVE PARTITION command performs further sequences of concurrency control operations for removing a partition of the second read-only RDF graph database, the REMOVE PARTITION command being performed before the ALTER REFRESH command, the REMOVE PARTITION's sequences of concurrency control operations including:

verifying, on the stage, if the partition to be removed exists, and if not, stopping the REMOVE PARTITION command; and uploading to the stage a TOMBSTONE_EXTENSION file, a successful uploading confirming that the partition to be removed of the second read-only RDF graph database exists.

11. The computer-implemented method of claim 2, further comprising:

latching the second read-only RDF graph database stored on the file storage, the latching being performed before obtaining in the stage the list of the files of the last snapshot; and unlatching the new snapshot after its registering in the catalog.

12. The computer-implemented method of claim 11, wherein latching the second read-only RDF graph database includes:

uploading to the file storage a file named with the last dataset snapshot name and a specific extension called START_EXTENSION; and verifying, at the uploading the file of the new snapshot in the stage and at each subsequent steps, the presence in the file storage of the START_EXTENSION file; and wherein unlatching the new snapshot after its registering in the catalog comprises verifying the presence in the file storage of the START_EXTENSION file and removing the START_EXTENSION file.

13. The computer-implemented method of claim 1, wherein the file storage is a distributed file storage.

14. The computer-implemented method of claim 1, wherein the catalog for storing metadata is stored on a database ensuring ACID properties and strong consistency.

15. A computer-implemented method of executing, with isolation guaranty, a triple pattern of a SPARQL query on a virtual RDF graph database including at least two RDF graph databases sees as one logically equivalent RDF graph database, the virtual RDF graph database comprising tuples, the virtual RDF graph database having been previously updated by updating a virtual RDF graph database comprising:

obtaining a file storage having a durability D property of ACID property, the file storage being distributed or not, the file storage guarantying consistent write;

obtaining a virtual RDF graph database, the virtual RDF graph database including:

a first RDF graph database stored on an in-memory data structure and updatable by streams of tuples to be added to and/or removed from the first RDF graph database; and a second read-only RDF graph database stored on the file storage and updatable by batches of tuples to be added to and/or removed from the second RDF graph database, thereby forming a snapshot that is a read-only and updatable;

obtaining a catalog for storing metadata describing the second read-only RDF graph database on the file storage, the catalog being compliant with ACID;

obtaining a stream of tuples to be added to and/or removed from the virtual RDF graph database and obtaining a batch of tuples to be added to and/or removed from the virtual RDF graph database;

applying the stream of tuples on the first RDF graph database of the virtual RDF graph database;

applying the batch of tuples on the second RDF graph database of the virtual RDF graph database by:

computing a snapshot of the second RDF graph database, including the batch of tuples, the computing guarantying ACID property of the snapshot by sequences of concurrency control operations duly executed using consistent write of the file storage;

storing, on the file storage, the computed snapshot; and registering the computed snapshot in the catalog, thereby obtaining an updated description of the virtual RDF graph database;

wherein the method of executing, with isolation guaranty, the triple pattern of the SPARQL query on the previously updated virtual RDF graph database further comprising:

obtaining a last registered snapshot of a virtual RDF graph database described in the catalog; and for the triple pattern obtained, executing the triple pattern on the first RDF graph database of the virtual RDF graph database and on the obtained last snapshot, thereby guarantying isolation of the execution of the triple pattern.

16. The computer-implemented method of claim 15, wherein the updating the virtual RDF graph database further comprises an ALTER REFRESH command performs the sequences of concurrency control operations duly executed, the ALTER REFRESH command ensuring the ACID properties of an update on the second RDF graph database of the virtual RDF graph database, the ALTER REFRESH's sequences of concurrency control operations includes:

uniquely identifying a last snapshot of the second RDF graph database, the last snapshot representing a state of the snapshot formed by the second RDF graph database at a given time;

verifying that no other ALTER REFRESH command is executed simultaneously, else stopping the ALTER REFRESH command and retaining the ALTER REFRESH command being already executed;

obtaining a list of the files in a stage of all snapshot(s), including the last snapshot;

filtering the files of the list of the files in the stage of the last snapshot, thereby obtaining a snapshot list naming files of the last snapshot to be made available for a subsequent access to the database, at the given time;

writing the names of the files of the snapshot list, thereby obtaining a new snapshot that is unregistered in the catalog;

uploading to the stage a file of the new snapshot; and registering the new snapshot in the catalog after the catalog has identified, in an ACID transaction, the new snapshot as being the last snapshot on which the batch of tuples is to be applied.

17. The computer-implemented method of claim 16, wherein obtaining the snapshot list naming files of the last snapshot to be made available for a subsequent access to the database, at the given time, further comprises:

obtaining a list of the name(s) of valid partition(s);

for each partition named in the list of valid partition(s):

verifying if a current update operation on the partition is still pending, and if yes, adding the partition to a list of valid partition(s) for which a current update operation(s) is still pending;

verifying if a past update operation on the partition has not been successfully achieved, and if yes, verifying, in the catalog, if a snapshot on which the unsuccessful update operation had been performed was registered in the catalog:

if not, ignoring the unsuccessful update operation;

if yes, removing the partition from the list of the valid partition(s) for which an update operation(s) is pending;

creating an empty snapshot list file, and completing the snapshot list file by adding:

the name(s) of the file(s) of the valid partition(s) of the list of valid partitions for which a current update operation(s) is still pending; else the name(s) of the file(s) of the valid partition(s) of the list of the name(s) of the valid partition(s) if the list of valid partition(s) for which a former update operation(s) is still pending is empty;

thereby obtaining the snapshot list naming file(s) of the last snapshot to be made available for a subsequent access to the database, at the given time; and verifying that each file listed in the snapshot list is present in the stage.

18. The computer-implemented method of claim 17, wherein:

the obtaining a list of the name(s) of valid partition(s) includes searching in the file storage, for each partition, for a file named with the partition name and a specific extension called VALID_EXTENSION, the VALID_EXTENSION file storing the name(s) of the file(s) of the partition, the VALID_EXTENSION file having been uploaded to the file storage at the time of a creation of the partition; and/or the obtaining a list of the name(s) of valid partition(s) includes searching, for each partition, in the file storage, for a file named with the partition name and a specific extension called TOMBSTONE_EXTENSION, the TOMBSTONE_EXTENSION file storing the name(s) of the file(s) of the partition that are object of a current delete operation, the TOMBSTONE_EXTENSION file having been uploaded to the file storage when performing a delete operation of the partition; and/or the verifying, for each partition named in the list of valid partition(s), if a current update operation on the partition is still pending, includes searching, in the file storage, for each partition, for a file named with the partition name and a specific extension called PENDING_EXTENSION, the PENDING_EXTENSION file storing the name(s) of the file(s) of the partition that are object of the current update operation, the PENDING_EXTENSION file having been uploaded to the file storage when performing the current update of the partition; and/or the verifying, for each partition named in the list of valid partition(s), if a past update operation on the partition has not been successfully achieved, includes searching in the file storage, for each partition, for a file named with the partition name and a specific extension called CONSUMED_EXTENSION, the CONSUMED_EXTENSION file storing the name(s) of the file(s) of the partition that were object of the past update operation, the CONSUMED_EXTENSION file having been uploaded to the file storage when performing the past update of the partition.

19. The computer-implemented method of claim 18, wherein the verifying, for each partition named in the list of valid partition(s), if a past update operation on the partition has not been successfully achieved further comprises: verifying that the content of the PENDING_EXTENSION file is coherent with the content of the VALID_EXTENSION file, and if not, considering that the list of the files of the last snapshot is the content of the VALID_EXTENSION file; and wherein the PENDING_EXTENSION file is ignored for the verifying, for each partition named in the list of valid partition(s), if a current update operation on the partition is still pending.

20. The computer-implemented method of claim 18, wherein an ALTER PARTITION command performs further sequences of concurrency control operations for the update of a partition of the second read-only RDF graph database, the ALTER PARTITION command being performed before the ALTER REFRESH command, the ALTER PARTITION's sequences of concurrency control operations including:

downloading, from the stage, the VALID_EXTENSION file of the valid partition to be updated, thereby obtaining the name(s) of the file(s) of the valid partition;

verifying that no ALTER PARTITION command is executed simultaneously on the valid partition, else stopping the ALTER PARTITION command and retaining the ALTER PARTITION command being already executed;

creating a PENDING_EXTENSION file storing the name(s) of the file(s) of the valid partition that is object of the current update operation, the name(s) of the file(s) of the valid partition being object of the current update operation and being obtained from the batch of tuples; and uploading the PENDING_EXTENSION file to the stage.

21. A database system comprising:

a processor communicatively coupled with a memory, the memory storing instructions that, when executed by the processor, cause the database system to update a virtual RDF graph database including at least two RDF graph databases seen as one logically equivalent RDF graph database, the virtual RDF graph database including tuples, by the processor being configured to:

obtain a file storage having a durability D property of ACID property, the file storage being distributed or not, the file storage guarantying consistent write;

obtain a virtual RDF graph database, the virtual RDF graph database including:

a first RDF graph database stored on an in-memory data structure and updatable by streams of tuples to be added to and/or removed from the first RDF graph database, the first RDF graph database is stored on an in-memory data structure of the system, and a second read-only RDF graph database stored on the file storage and updatable by batches of tuples to be added to and/or removed from the second RDF graph database, thereby forming a snapshot that is a read-only and updatable;

obtain a catalog for storing metadata describing the second read-only RDF graph database on the file storage, the catalog being compliant with ACID;

obtain a stream of tuples to be added to and/or removed from the virtual RDF graph database and obtaining a batch of tuples to be added to and/or removed from the virtual RDF graph database;

apply the stream of tuples on the first RDF graph database of the virtual RDF graph database;

apply the batch of tuples on the second RDF graph database of the virtual RDF graph database by the processor being configured to:

compute a snapshot of the second RDF graph database, including the batch of tuples, the computing guarantying ACID property of the snapshot by sequences of concurrency control operations duly executed using consistent write of the file storage;

store, on the file storage, the computed snapshot; and register the computed snapshot in the catalog, thereby obtaining an updated description of the virtual RDF graph database.

\* \* \* \* \*